United States Patent [19]

Yabumoto

[11] Patent Number: 5,717,951

[45] Date of Patent: Feb. 10, 1998

[54] METHOD FOR STORING AND RETRIEVING INFORMATION ON A MAGNETIC STORAGE MEDIUM VIA DATA BLOCKS OF VARIABLE SIZES

[76] Inventor: Kan W. Yabumoto, 1117 E. Gartner Rd., Naperville, Ill. 60540

[21] Appl. No.: 511,721

[22] Filed: Aug. 7, 1995

[51] Int. Cl.[6] .................................................. G06F 17/30
[52] U.S. Cl. ............................................ 395/831; 395/611
[58] Field of Search ................................ 395/601, 602, 395/616, 617, 618, 619, 620, 621, 622, 427, 428, 438, 439, 440, 441, 410, 411, 412, 413, 414, 415, 416, 417, 418, 829, 830, 831, 832

[56] References Cited

U.S. PATENT DOCUMENTS

| | | | |
|---|---|---|---|
| 4,969,055 | 11/1990 | Oberjatzas et al. | 360/32 |
| 4,972,417 | 11/1990 | Sako et al. | 371/37.4 |
| 5,113,512 | 5/1992 | Miki et al. | 395/416 |
| 5,274,772 | 12/1993 | Dunn et al. | 395/831 |
| 5,327,535 | 7/1994 | Ogata et al. | 395/440 |
| 5,335,119 | 8/1994 | Shih et al. | 360/53 |
| 5,384,666 | 1/1995 | Kanota et al. | 360/32 |
| 5,384,673 | 1/1995 | Yoshioka et al. | 360/72.2 |
| 5,414,570 | 5/1995 | Fry et al. | 360/48 |
| 5,485,606 | 1/1996 | Midgdey et al. | 395/610 |

*Primary Examiner*—Thomas G. Black
*Assistant Examiner*—Ruay Lian Ho
*Attorney, Agent, or Firm*—Darin E. Bartholomew

[57] ABSTRACT

A method for storing and retrieving information on a magnetic storage medium, such as magnetic tape, organizes files into data blocks of variable encoded block sizes. The encoded block sizes indicate file boundaries of files, intrablock data organization and/or interblock data organization to facilitate data retrieval. For example, if encoded block sizes indicate file boundaries, then filemarks are not needed to separate files from each other. During an encoding process, data blocks are assigned corresponding data formats and block sizes are preferably quantized to equal distinctive integer multiples of an encoding constant. Decoding is accomplished by performing a modulo function on the quantized block size to identify corresponding data formats assigned to the data blocks. One practical application of the method of storage and retrieval is recovery of a corrupt or a missing file directory, which references files stored on the magnetic storage medium.

86 Claims, 29 Drawing Sheets

FIG. 3A

| DATA ORGANIZATION | FILE DATA | DESCRIPTIVE DATA | BLOCK LENGTH ENCODING EQUATION | BLOCK LENGTH |
|---|---|---|---|---|
| PRIMARY DATA FORMAT —806 | X | YES | IF $Q_R \% 2 = 0$, THEN $Q_R = Q_A$. OTHERWISE, $Q_A = Q_R + 1$. | EVEN |
| SECONDARY DATA FORMAT —808 | YES | NO | IF $Q_R \% 2 \neq 0$, THEN $Q_R = Q_B$. OTHERWISE, $Q_B = Q_R + 1$. | ODD |

FIG. 3B

| DATA ORGANIZATION | FILE DATA | DESCRIPTIVE DATA | BLOCK LENGTH DECODING EQUATION | BLOCK LENGTH |
|---|---|---|---|---|
| PRIMARY DATA FORMAT —806 | X | YES | IF $Q_R \% 2 = 0$, THEN $Q_R = Q_A$. | EVEN |
| SECONDARY DATA FORMAT —808 | YES | NO | IF $Q_R \% 2 \neq 0$, THEN $Q_R = Q_B$. | ODD |

FIG. 4A

| DATA ORGANIZATION | FILE DATA | DESCRIPTIVE DATA | BLOCK LENGTH ENCODING EQUATION |
|---|---|---|---|
| PRIMARY DATA FORMAT | X | YES | $Q_c = nK$ |
| SECONDARY DATA FORMAT | YES | NO | $Q_D = nK + Z$ |

FIG. 4B

| DATA ORGANIZATION | FILE DATA | DESCRIPTIVE DATA | BLOCK LENGTH DECODING EQUATION |
|---|---|---|---|
| PRIMARY DATA FORMAT | X | YES | $Q \% K = 0$, FOR $Q = Q_c$ |
| SECONDARY DATA FORMAT | YES | NO | $Q \% K \neq 0$, FOR $Q = Q_D$ |

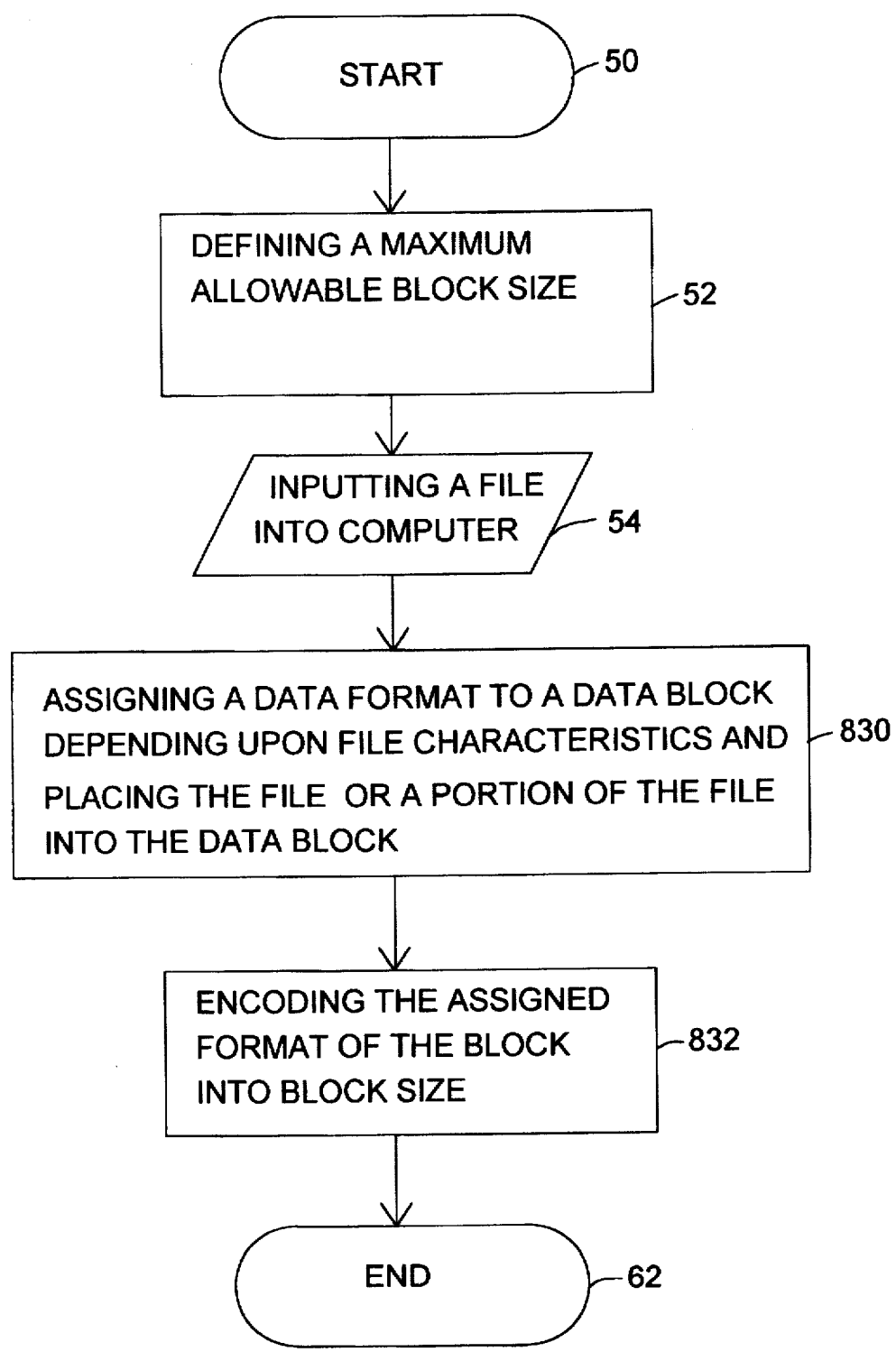

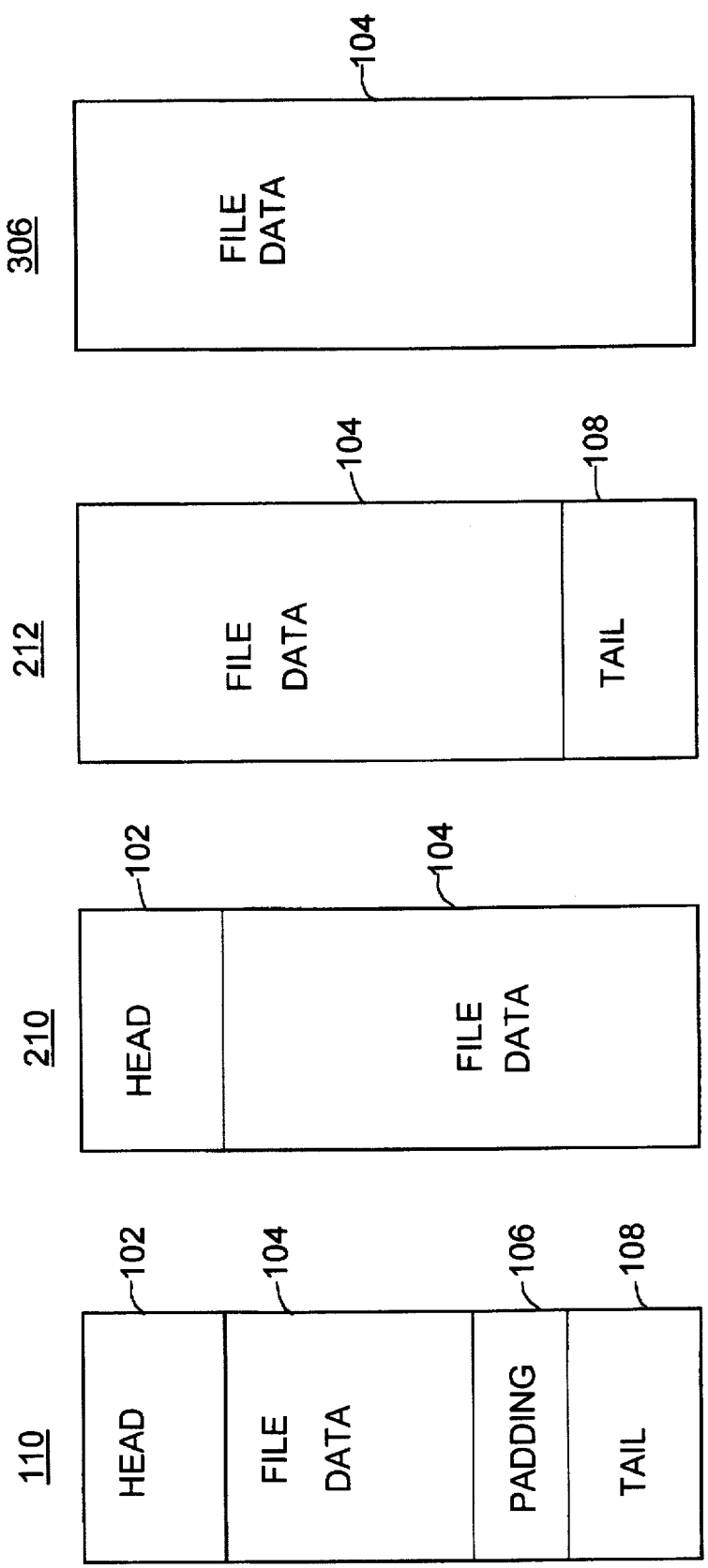

FIG. 7A

| DATA FORMAT NAME | DATA ELEMENTS | | |
|---|---|---|---|
| | HEAD-102 | TAIL-108 | DATA-104 |
| 110- FIRST DATA FORMAT | YES | YES | X |
| 210- SECOND DATA FORMAT | YES | NO | X |
| 212- THIRD DATA FORMAT | NO | YES | X |
| 306- FOURTH DATA FORMAT | NO | NO | YES |

FIG. 7B

| DATA FORMAT NAME | BLOCK LENGTH ENCODING EQUATION | DATA ELEMENTS | | |
|---|---|---|---|---|
| | | HEAD~102 | TAIL~108 | DATA~104 |
| FIRST DATA FORMAT | $Q_3 = 3C + mP$ | YES | YES | X |
| SECOND DATA FORMAT | $Q_2 = 2C + mP$ | YES | NO | X |
| THIRD DATA FORMAT | $Q_1 = C + mP$ | NO | YES | X |
| FOURTH DATA FORMAT | $Q_0 = mP$ | NO | NO | YES |

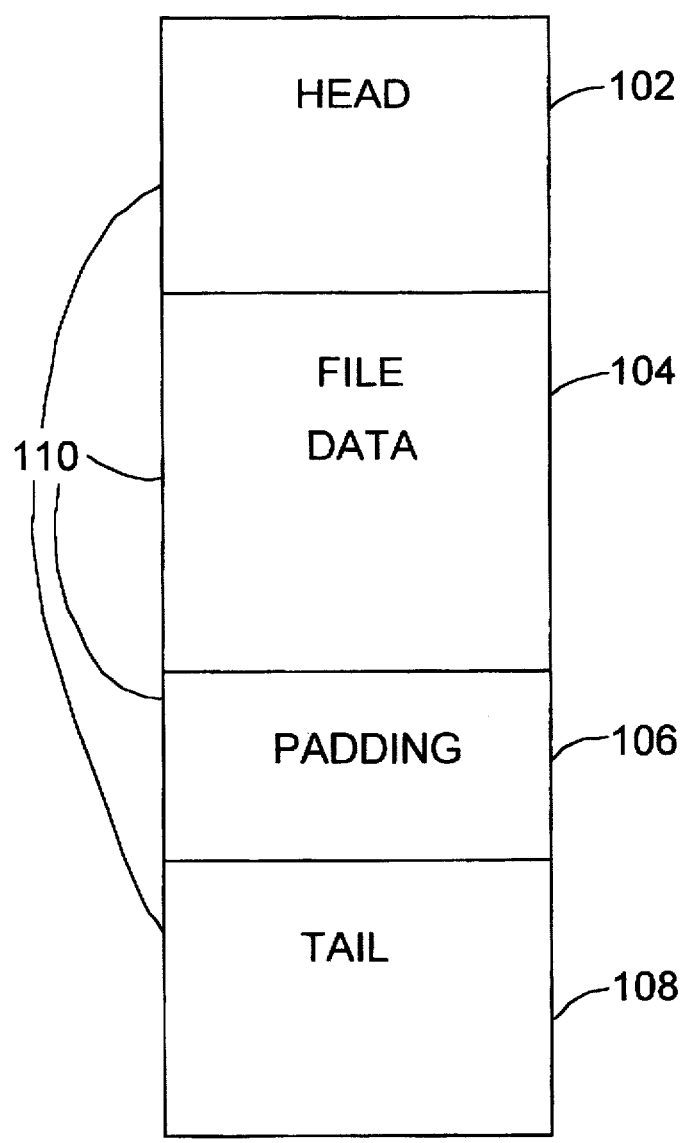

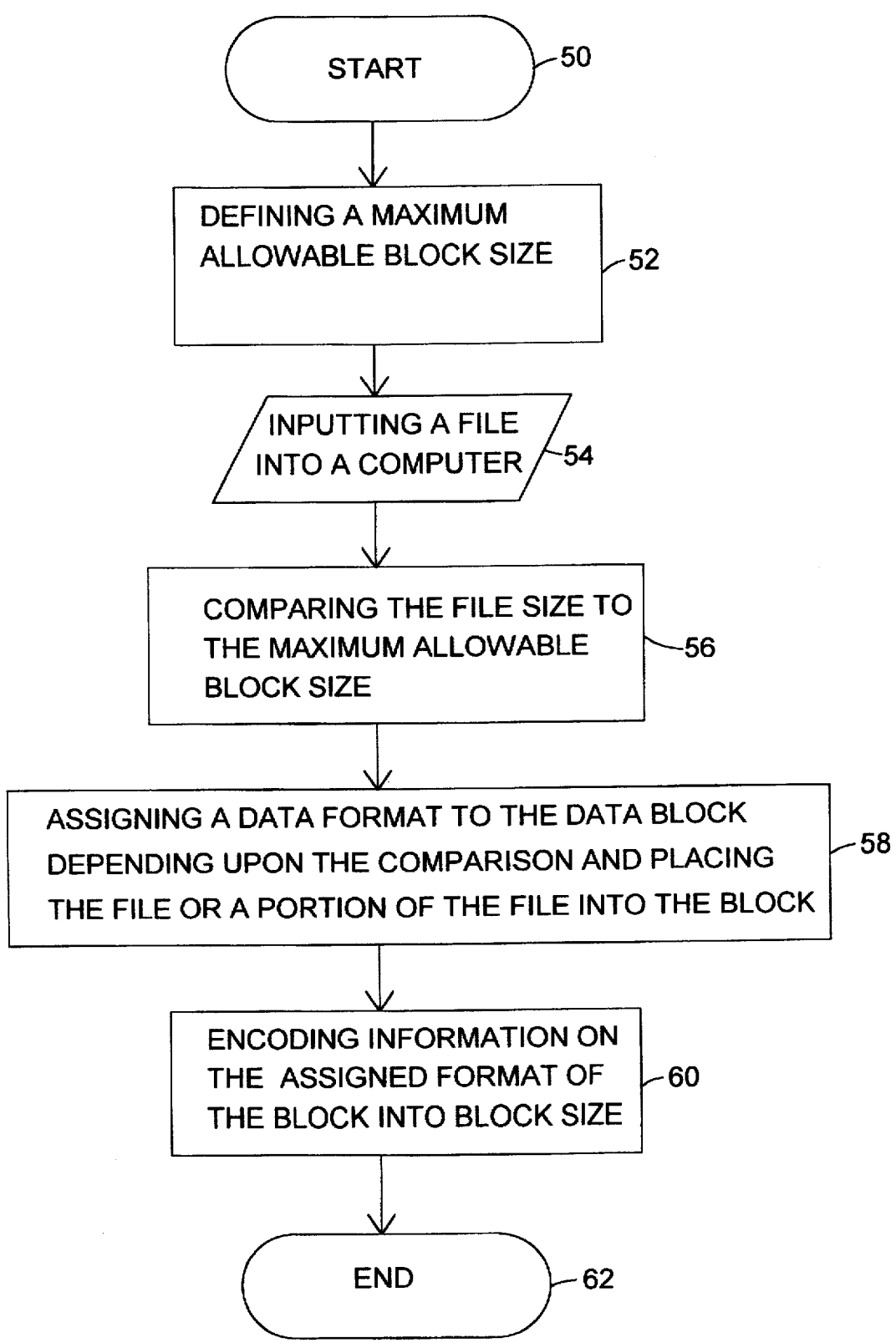

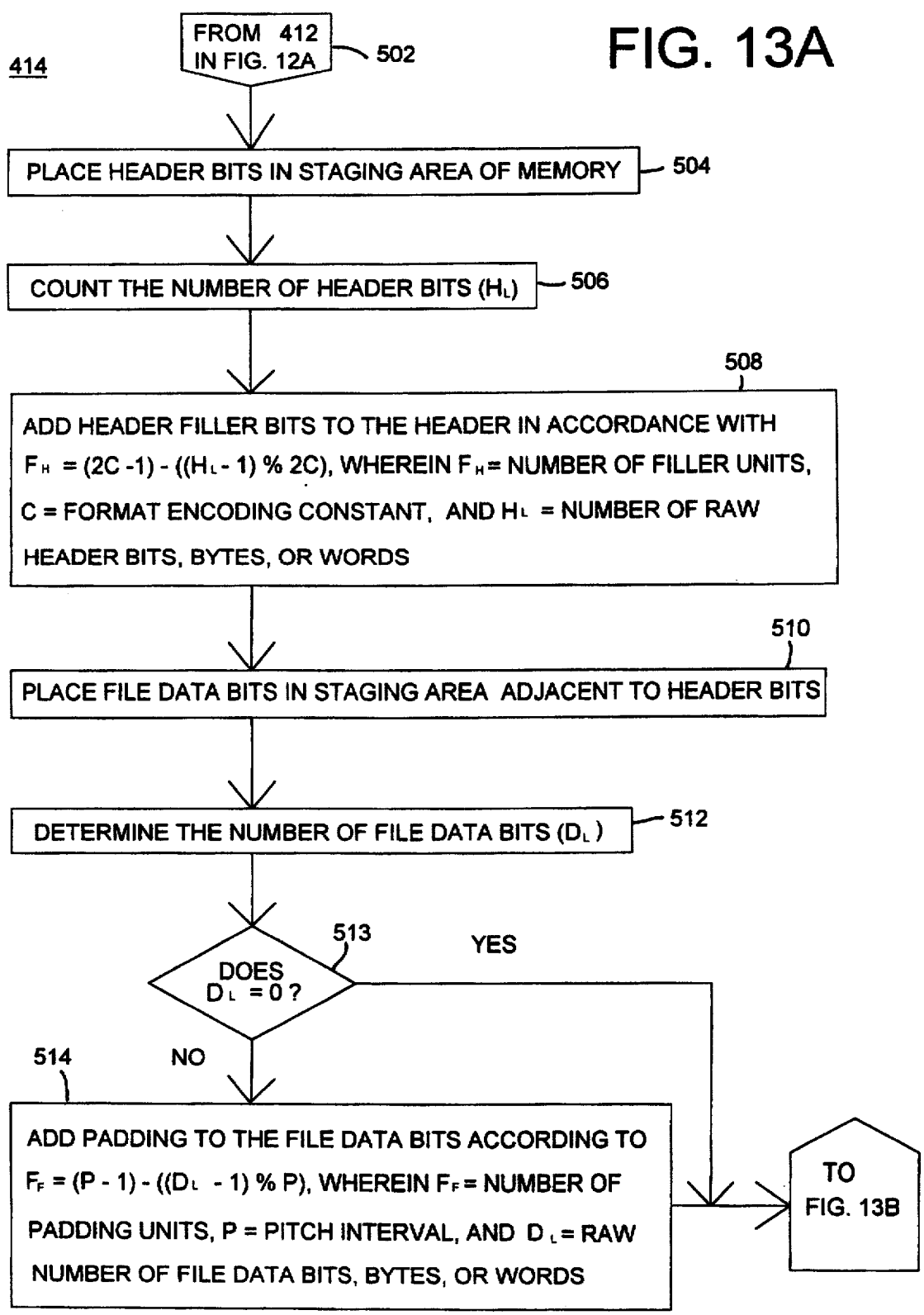

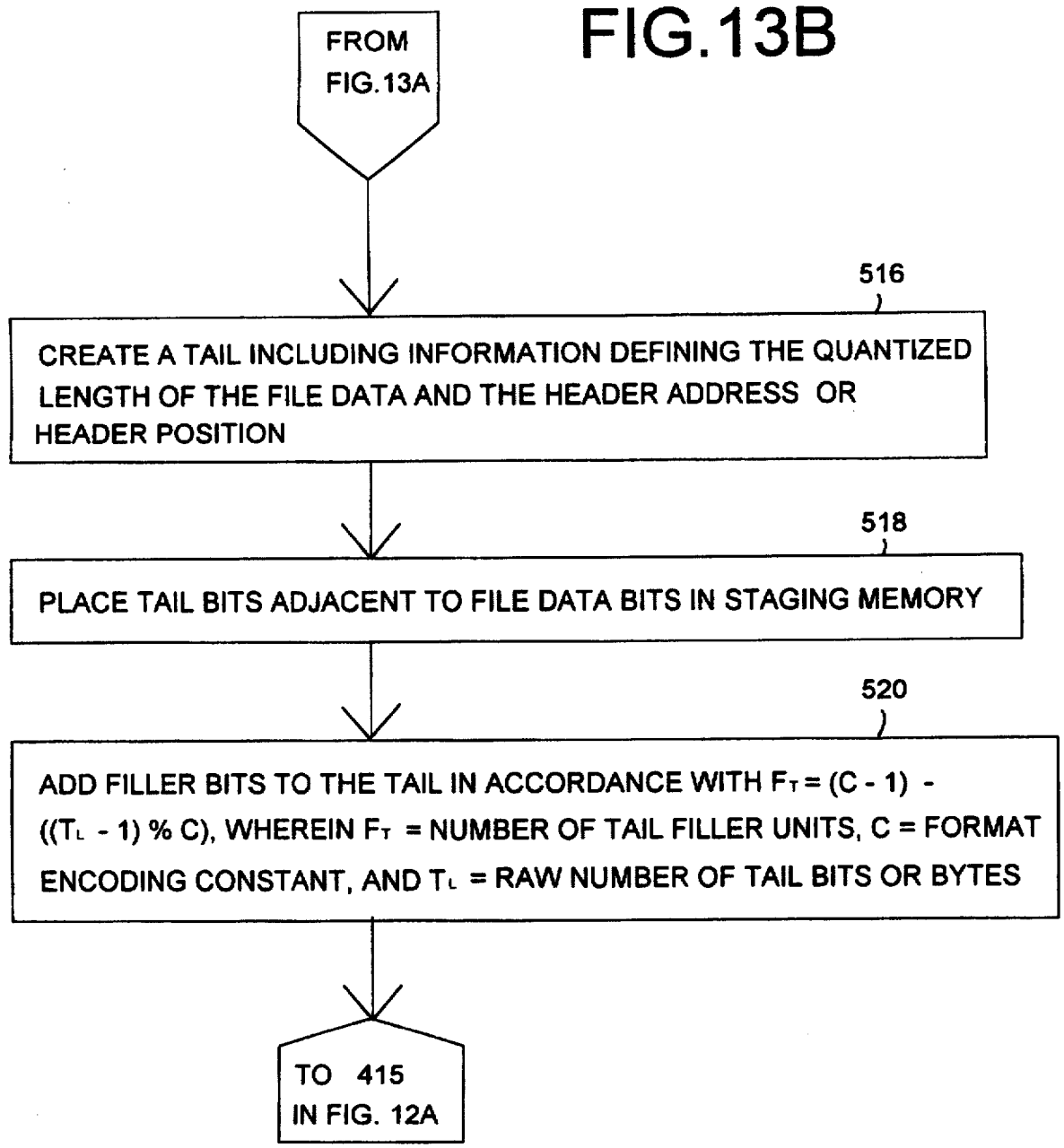

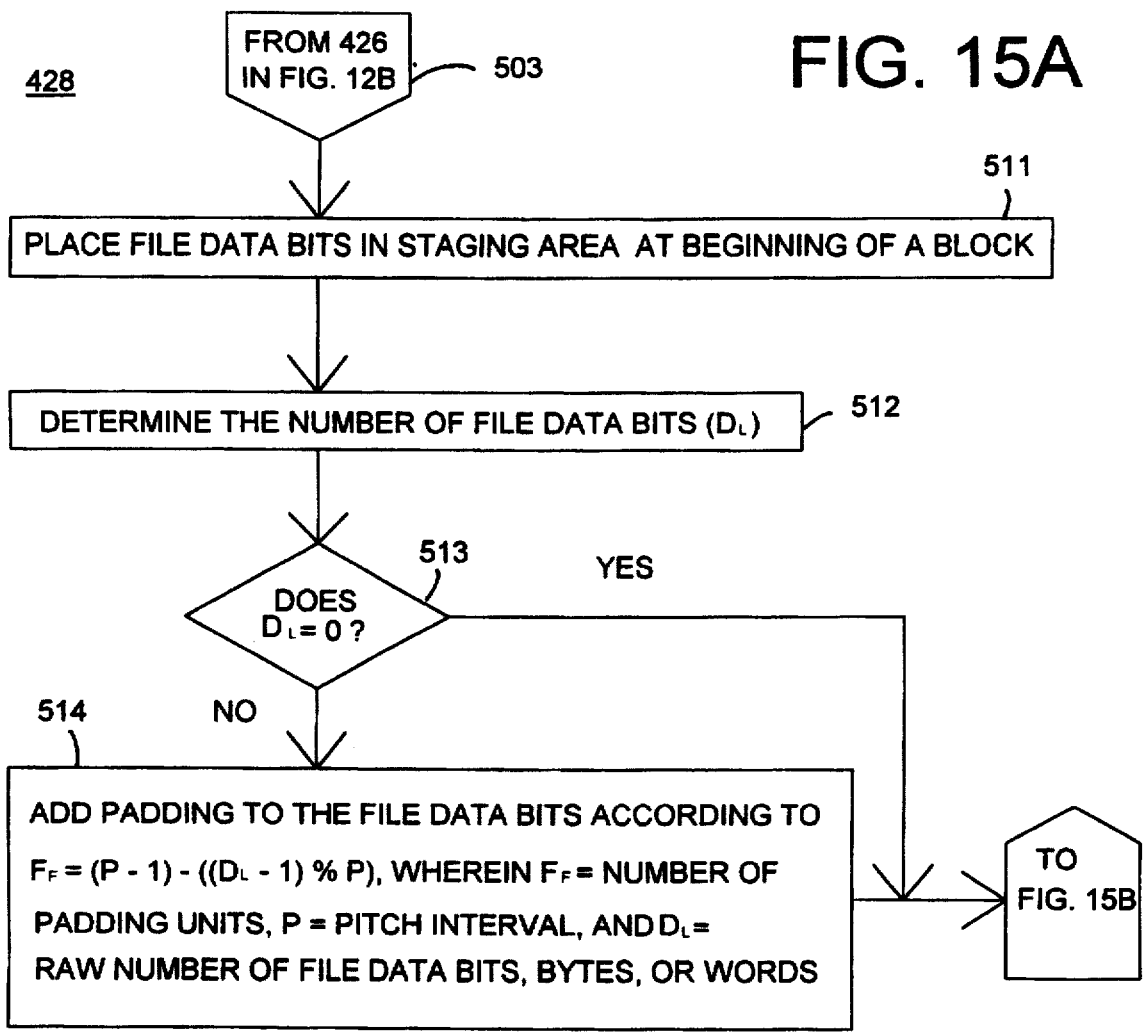

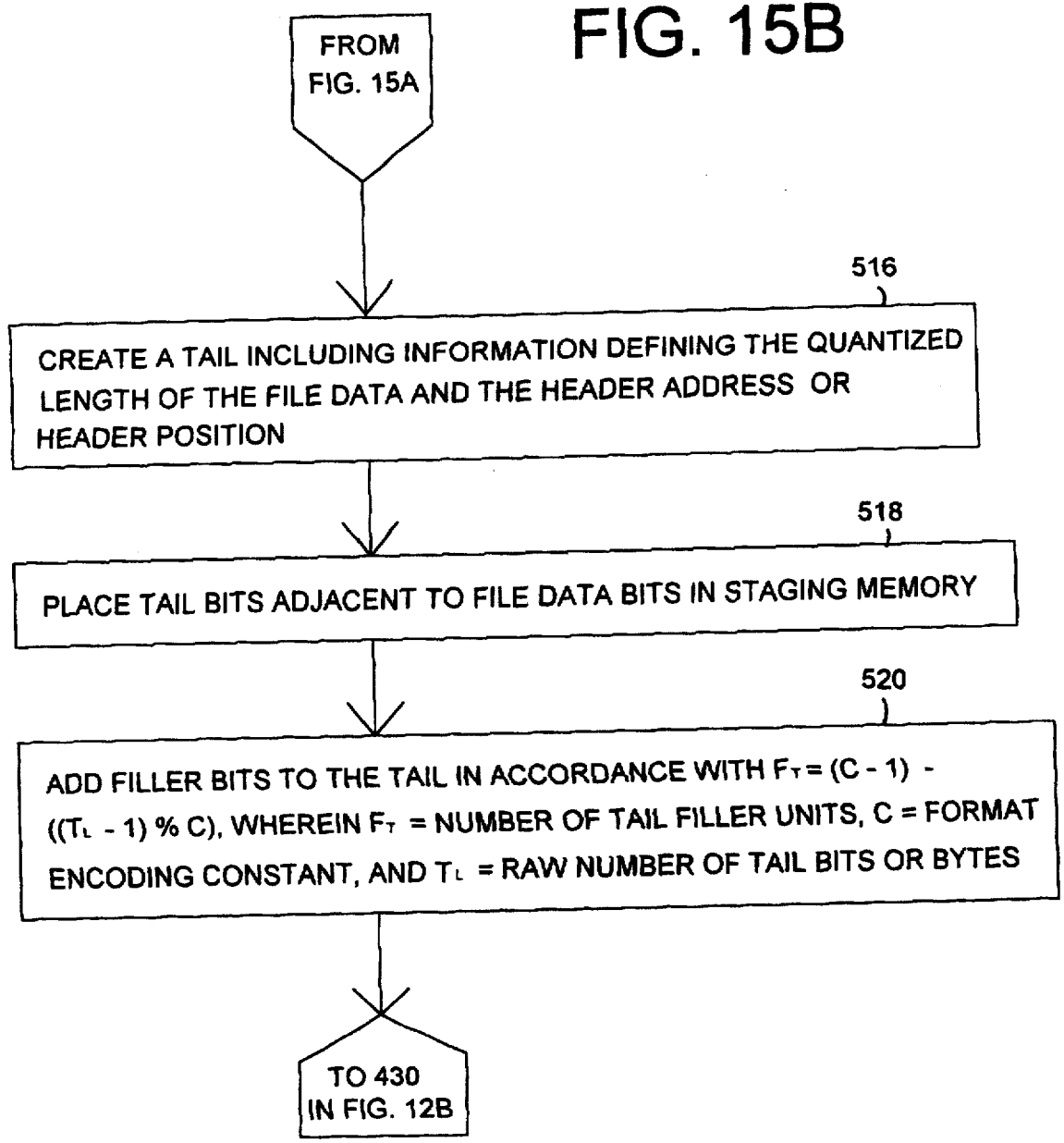

FIG. 17

| DATA FORMAT NAME | BLOCK LENGTH DECODING EQUATION | DATA ELEMENTS | | |
|---|---|---|---|---|
| | | HEAD ~102 | TAIL ~108 | DATA ~104 |
| 110 — FIRST DATA FORMAT | $Q \% P = 3C$, for $Q = Q_3$ | YES | YES | X |
| 210 — SECOND DATA FORMAT | $Q \% P = 2C$, for $Q = Q_2$ | YES | NO | X |
| 212 — THIRD DATA FORMAT | $Q \% P = C$, for $Q = Q_1$ | NO | YES | X |
| 306 — FOURTH DATA FORMAT | $Q \% P = 0$, for $Q = Q_0$ | NO | NO | YES |

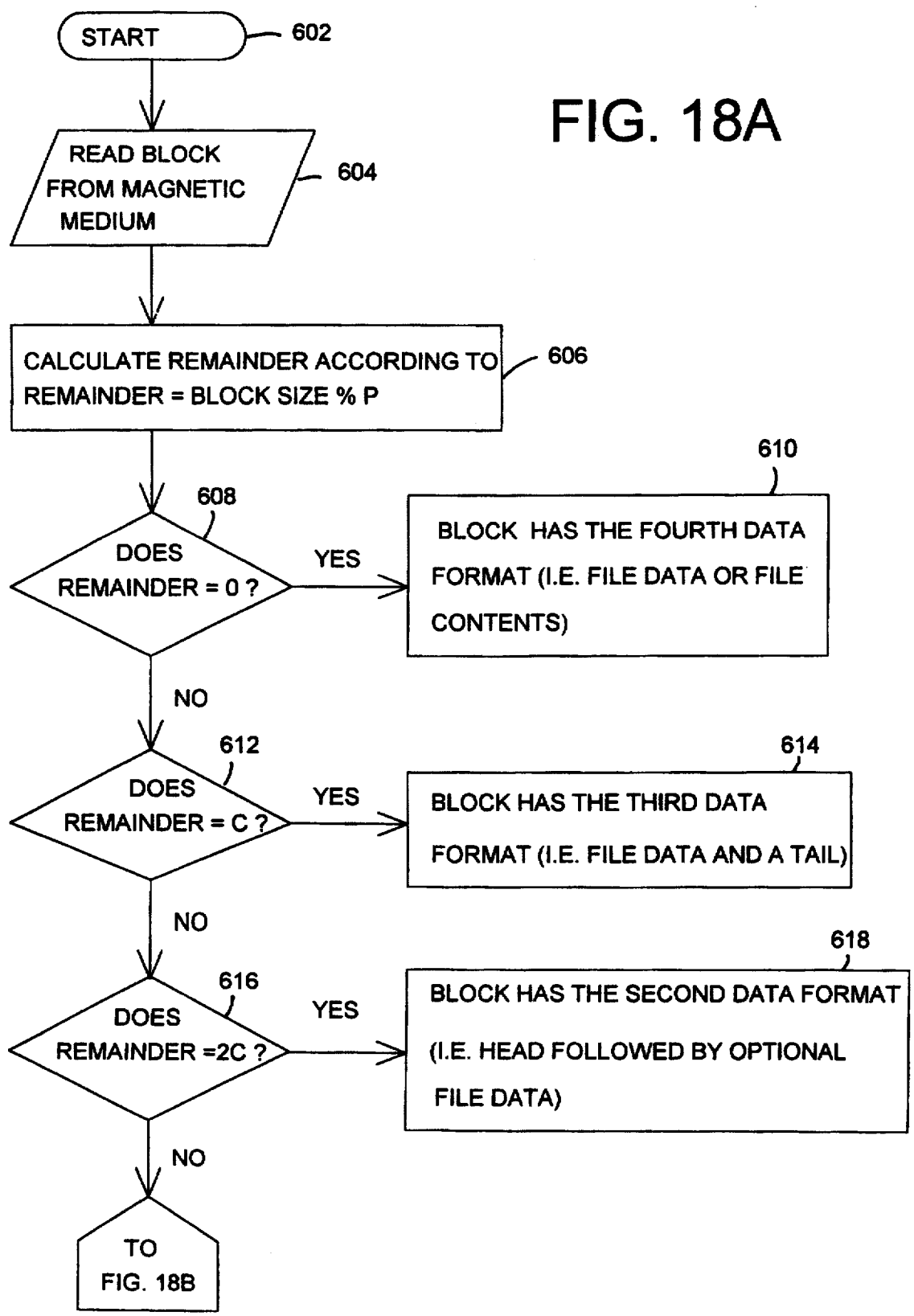

METHOD FOR STORING AND RETRIEVING INFORMATION ON A MAGNETIC STORAGE MEDIUM VIA DATA BLOCKS OF VARIABLE SIZES

The present invention relates generally to a method for storing and retrieving information on a magnetic storage medium; and, more particularly, to a method for storing and retrieving files on a magnetic tape using data blocks of variable sizes.

BACKGROUND ART

Commercially available magnetic disks frequently have insufficient storage capacity for convenient storage of databases, graphical drawings, computer-aided-design (CAD) drawings, multimedia applications, or archived data. Magnetic floppy disks and diskettes are limited in the maximum storage capacity because of fixed spatial dimensions inherent in sector-based media. For example, personal computers typically use commercially available 3.5 inch floppy diskettes which usually store up to 1.44 megabytes of data. The transfer of programs or information from computers using conventional diskettes can be awkward, requiring the repetitive insertion of a series of diskettes while responding to prompts generated by the computer system.

As computer systems evolve, memory intensive graphical and multimedia applications need a convenient storage media which is both capable of reading and writing data. Although optical disks offer impressive storage capacity, at present many commercially available optical disks merely have read-only capability. While background art magnetic tape storage systems have offered high storage capacity, such storage systems have failed to organize the stored information for convenient retrieval from the tape. Reading files stored via background art magnetic tape systems is often prohibitively time-consuming for the computer user. Moreover, if the area of the tape storing a master file directory is abraded, missing, or otherwise damaged, the entire contents of the tape may be rendered incomprehensible. Consequently, many state-of-the-art tape storage systems are merely suited for data retrieval in the event of catastrophic failure of a hard disk drive. Therefore, a need exists for a magnetic tape storage system and method which offers enhanced retrieval capabilities, such as increased reliability and faster reading access.

Background art magnetic tape storage and retrieval software have been based on three main configurations: (1) the master directory configuration, (2) the marker configuration, and (3) the signature word configuration. The master directory configuration places a directory containing data concerning the position, or file address, of the files stored on the magnetic tape. The master directory is typically located at the beginning of the tape to facilitate retrieval of files. The master directory optionally contains various attributes of the files stored on the tape, such as file name, file length, and file creation date. Padding may be added to the files in the master directory configuration such that each file address only has a certain assigned; hence, predictable value.

The marker configuration uses filemarks and/or setmarks to delineate the beginning of files, the end of files, and/or the location of directory information. Background art tape control soft-are may use an individual filemark, an individual setmark, multiple setmarks, multiple filemarks, or combinations of filemarks and setmarks to tag appropriate data arrangements.

Filemarks and setmarks are special markers which have no associated data values. Locating files and data retrieval by using filemarks and/or setmarks becomes inefficiently slow when more than a certain threshold number of files is stored on magnetic tape.

The signature word configuration places a unique character string in the data block to represent the beginning and/or the end of a file. The unique character string is a character string which is unlikely to occur as data in the file. However, if the signature word has an insufficient length, the data in the file may coincidentally mimic the signature word causing errors in locating the beginning and/or end of a file. Therefore, signature word systems restrict the computer user's freedom to select data values; prohibited data values are an inherent feature. Moreover, a signature word system can be maliciously or unintentionally defeated by a user if the user inserts the signature word into the file or data portion. The computer system is unable to distinguish the bogus signature word from the true signature word. As a result, the data is corrupted or rendered inaccessible during file retrieval.

SUMMARY OF THE PRESENT INVENTION

The method for storing and retrieving information on a magnetic storage medium relates to a software program for storing files on magnetic tape via a digital tape drive. Files are defined broadly as any collection of data storage units. Files are stored on the magnetic tape via logical data blocks. Each logical data block represents an aggregation of data storage units for a discrete data transfer.

The method for storing and retrieving information encodes information into block sizes of logical data blocks. The encoded information relates to file boundaries, intrablock data organization, and/or interblock data organization. File boundaries represent the beginning and the end of a particular file stored on the magnetic tape. Intrablock organization information refers to data organization or an arrangement of data elements within an individual data block. Interblock organization information refers to the relative position of a particular data block within a group of data blocks representing a single file.

Decoding block sizes of blocks encoded with information on file boundaries allows one to distinguish between different files during the data retrieval process. File boundaries are distinguishable even when reading the magnetic tape at an arbitrary tape position. In accordance with the present invention, advantageously no filemarks nor setmarks are needed to define the file boundaries of files recorded on the magnetic tape.

Decoding block sizes encoded with intrablock organization information allows one to distinguish between file data and descriptive data relating to a particular file. Descriptive data describes the file characteristics or file properties of a particular file. Descriptive data may include, for example, a filename, a file size, and a file creation date of a corresponding file.

Decoding the block sizes encoded with interblock organization information allows one to distinguish between different blocks within a group of data blocks representing a single file. Files may be divided into a beginning portion, an intermediate portion, and an end portion, among others. After starting from an arbitrary reading position among data blocks encoded with interblock organization information, one can determine whether the data block read is at the beginning, intermediate, or end of a particular file.

The method for storage and retrieval of information involves an encoding process and a decoding process. For example, according to the encoding process, data formats are assigned to data blocks to be recorded on the magnetic storage medium. Data formats may be assigned depending on factors such as the file size of the files to be stored on the magnetic storage medium. The block size of the data blocks are adjusted to indicate the particular data format assigned. Data blocks having different encoded block sizes are written on the magnetic storage medium via the magnetic storage device.

The method of data storage and retrieval may be practiced by encoding information into (1) odd and even block lengths, (2) quantized and nonquantized block lengths, or (3) a plurality of distinguishable quantized block lengths. If the plurality of distinguishable quantized block lengths is used, then each data format has one corresponding quantized block length or set of corresponding quantized block lengths, which are multiples of a format encoding constant. The data block lengths are variable, but the data block lengths are limited to quantized length data blocks. Decoding the quantized data block size involves the steps of reading the selected data block from the magnetic storage medium to obtain the data block size and then performing a modulo function on the data block size to calculate a remainder indicative the particular data format.

The decoding process evaluates the block size of data blocks written on the magnetic storage medium to determine the corresponding data format. Once the data format is decoded, data blocks of different data formats may be segregated for different subsequent treatment. For post decoding processing and software instructions, information stored in one format may be ignored while focusing processing tasks on information stored in a selected format. For instance, data blocks containing file data may be processed while data blocks containing descriptive data (i.e. file properties) are ignored.

If the magnetic storage medium is physically damaged or corrupted, then the present invention may permit reconstruction of corrupt data, such as a catalog file or files. The reconstruction method involves producing a new catalog file to replace an unreadable or missing catalog file. The new catalog file contains directory information derived from descriptive data saved on the magnetic storage medium pursuant to the encoding process. Files stored on the magnetic storage medium are retrieved by referencing the new catalog file after the recovery process.

The method for storage and retrieval enhances information accessibility and reliability of magnetic tapes so that a computer user may use one magnetic tape instead of many commercially available diskettes or floppy disks. The software program enables a digital tape drive to emulate a disk drive with substantial storage capacity. Data retrieval is enhanced by providing definitive boundaries for different files. Reduced reliance upon, or elimination of, filemark and setmark techniques to locate files permits increased retrieval speed for the magnetic storage device. Moreover, even after a file is located post decoding processing may be enhanced by segregating file data and descriptive data for divergent, prospective treatment. If the file is an audio recording or a multimedia work, encoding variable block sizes with information on interblock data organization facilitates file searching. One may search a file stored in multiple data blocks for the beginning, intermediate, or the end of the file among other possible file positions.

BRIEF DESCRIPTION OF THE DRAWINGS

FIG. 3A is a chart showing block length encoding equations for an encoding scheme using even and odd length data blocks for the primary data format and the secondary data format, respectively.

FIG. 3B is a chart showing the block length decoding equations for the encoding scheme of FIG. 3A.

FIG. 4A is a chart showing block length encoding equations for an encoding scheme using data block having either quantized block lengths or nonquantized block lengths.

FIG. 4B is a chart showing the block length decoding equations for the encoding scheme of FIG. 4A.

FIG. 5 is a flow chart generally illustrating the steps of the encoding process for the method of storage and retrieval with regards to two data formats.

FIG. 6 shows data blocks having a plurality of different data formats.

FIG. 7A is a chart illustrating the data block composition for data blocks in four different data formats.

FIG. 7B is a chart illustrating block length encoding equations for data blocks of four data formats.

FIG. 8 shows a data block containing a small length file and having first data format.

FIG. 11 is a flow chart of the general encoding process wherein file size determines the data format assigned.

FIG. 13A and FIG. 13B are a flow chart illustrating the quantization of data block size for the first data format in more detail than FIG. 12A shows.

FIG. 15A and FIG. 15B are a flow chart illustrating the quantization of the data block size for the third data format in more detail than FIG. 12B shows.

FIG. 17 is a chart illustrating the decoding equations for the method for data storage and retrieval where for data formats are used; FIG. 17 is the analog of the block length encoding equations of FIG. 7B.

FIG. 18A and FIG. 18B are a flow chart of a first embodiment of the decoding process for the specific case where four data formats are used.

DETAILED DESCRIPTION

Hardware

Figure 1:
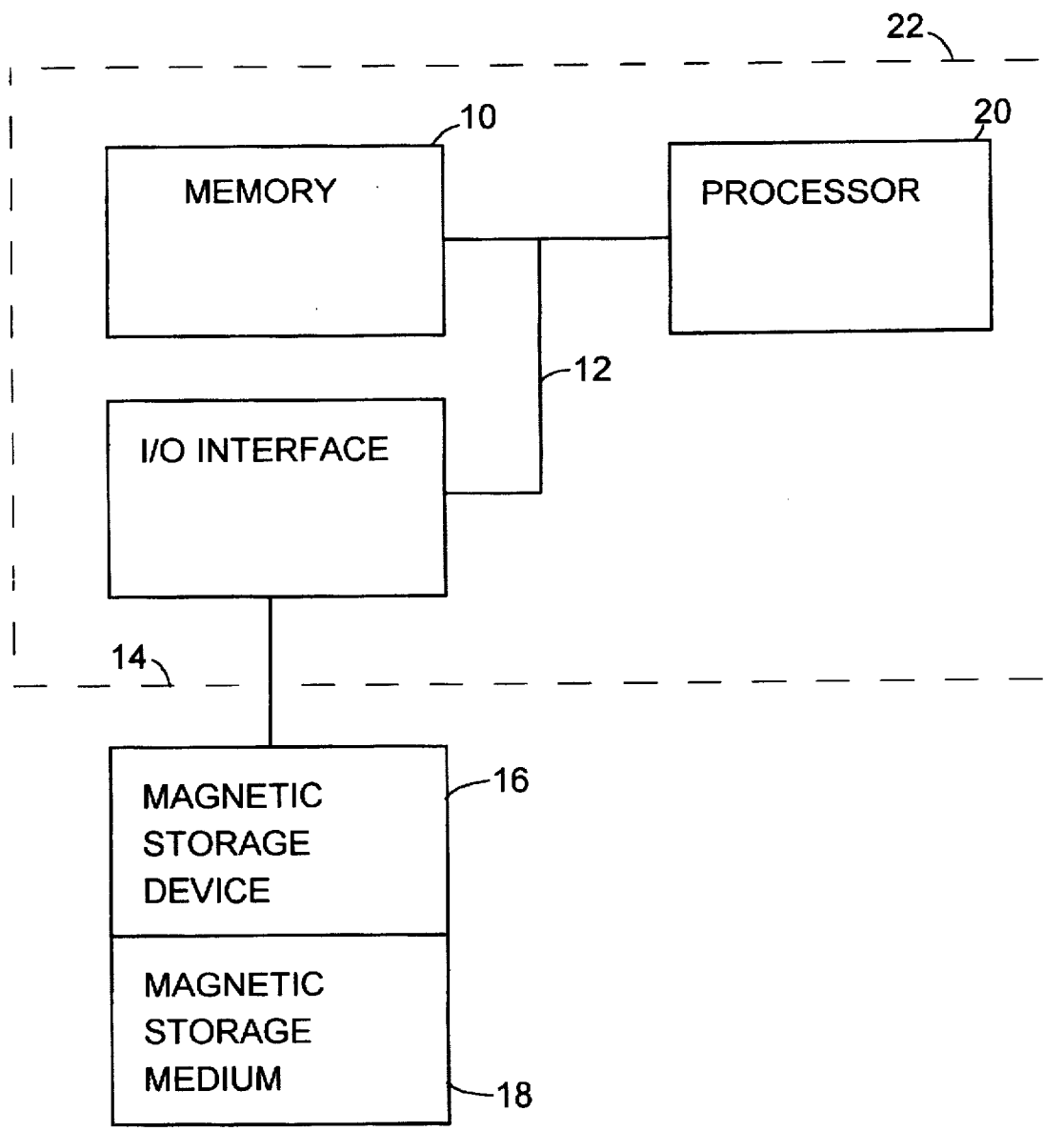
FIG. 1 is a block diagram exemplifying a hardware configuration for system and the method for storage and retrieval on a magnetic storage medium.

FIG. 1 illustrates a hardware configuration for executing the software program and the system for formatting a magnetic medium of the present invention. The hardware configuration comprises a general purpose computer 22 equipped with a magnetic storage device 16. The magnetic storage device 16 accepts a magnetic storage medium 18, such as a commercially available digital tape.

The computer 22 includes a processor 20, memory 10, and an input/output (I/O) interface 14 which communicate via a databus 12. The processor 20 comprises a microprocessor, a central processing unit, or the like. The memory 10 comprises, for example, random access memory (RAM) or optical memory. To optimize system performance the memory 10 preferably includes cache memory. A portion of the memory 10, which is called a staging area, is either permanently dedicated or dynamically allocated to storing data prior to writing the data via the magnetic storage device 16. The memory 10 may contain a database having (1) rules for data organization and/or composition of data elements, and (2) block length encoding equations defining permissible block lengths. Alternatively, data storage means for storing data, such as a hard disk drive, may be coupled to the databus 12 for storing the database.

The I/O interface 14 is connected to the magnetic storage device 16. The I/O interface 14 comprises a buffer memory and a controller for managing incoming and outgoing data to and from the magnetic storage device 16. The read buffer memory should be equal to or larger than the maximum data block size to be read by the magnetic storage device 16 to prevent data truncation and loss. Likewise, the write buffer memory should be equal to or larger than the maximum block size to be written on the magnetic storage medium 18.

In the present state of the art, the I/O interface 14 comprises, for example, a small computer system interface (SCSI), an enhanced small computer system interface, an Integrated Drive Electronics (IDE) interface, an Enhanced Integrated Drive Electronics (EIDE) interface, or the like. A SCSI is a computer bus interface standard that defines standard physical and electrical connections for devices such as disk drives, optical disk drives, and tape drives.

A magnetic storage device 16 is a device which can both read and write data to a magnetic storage medium 18. The magnetic storage device 16 operates on logical data entities called data blocks or logical data blocks. For example, a magnetic storage device 16 can typically (1) read a data block from the magnetic storage medium 18, (2) write a data block to the magnetic storage medium 18, (3) move (i.e. skip) a specified number of blocks forward or backwards, and (4) seek a filemark, a setmark, or an end-of-data (EOD) mark. In practice, prior to recording on the magnetic storage medium 18, the magnetic storage device 16 may arrange logical data blocks into frames and/or groups, while using bit interleaving to enhance reliability.

In a preferred embodiment, the magnetic storage device 16 comprises a digital tape drive. For instance, the magnetic storage device 16 may comprise a commercially available digital data storage (DDS) tape drive, such as those which are available through Hewlett-Packard Ltd. at Filton Road, Stoke Gifford, Bristol BS12 6QZ, in the United Kingdom. While a digital tape drive could record logical data blocks as physical data blocks, commercially available digital tape drives frequently arrange data blocks into physical frames and/or physical frame groups prior to recording on digital tape. The digital tape drive is optimally compatible with a data compression algorithm, such as the DCLZ data compression algorithm (i.e. IS O/IEC 11558 standard published in October, 1992).

However, in alternate embodiments the magnetic storage device 16 may comprise a digital tape drive with stationary heads, such as a commercially available "quarter-inch cartridge" (QIC) tape drive. Magnetic storage devices 16 with stationary heads cannot generally store as much data as devices with rotating heads because the lower relative velocity of the tape with regards to the head produces weaker magnetic recording fields.

The magnetic storage medium 18 is preferably a digital tape in cartridge or cassette form. Commercially available digital tapes presently include digital data storage (DDS), digital audio tape (DAT), quarter-inch cartridge (QIC), quarter-inch cartridge wide (QIC-Wide), QIC-3010-MC, and digital linear tape (DLT) among others. In alternative embodiments, the magnetic storage medium may comprise streaming tape, reel-to-reel tape, a magnetic strip, video recording tape, or the like. The selection of the magnetic storage device 16 will govern the selection of a corresponding magnetic storage medium 18.

In sum, the hardware may comprise virtually any commercially available personal computer equipped with a digital tape drive, any mainframe computer equipped with a magnetic storage device, or any client-server computer system equipped with a magnetic storage device. The operating system of the computer 22 is not critical. In other embodiments, the computer 22 and the magnetic storage device 16 are integrated into a multimedia system, a digital audio system, a digital video system, a household video recording system, a household audio recording system, or the like.

Data Organization and Definitions

The magnetic storage device 16 operates on logical data entries called logical data blocks, which are referred to as data blocks for short. A logical data block is an aggregation of storage units suitable for a discrete data transfer to or from a magnetic storage device 16. One or more logical data blocks are commonly represented as a continuous stream of data, called virtual blocks, within the memory of a computer until the actual data blocks are transferred to or from the magnetic storage medium. A physical data block is, for example, a data block which is directly written to or read from a magnetic storage medium as a data block. Any data block may be defined simply as a matrix of data, an array of data, a byte, a word, a series of bytes, a series or words, a series of bits, or the like. Data blocks have corresponding data block sizes. Throughout the claims and the specification, data block sizes (i.e. lengths) are measured in terms of "storage units" which refer to bits, one or more bytes, one or more words, or one dimension of a multidimensional array. In accordance with the present invention, each data block may contain data elements, which include descriptive data alone, file data alone, or both descriptive data and file data.

Throughout the claims and the specification, file data is defined broadly as a collection of storage units with no particular data structure or data organization. File data may be generated by virtually any application program. File data may include video, audio, and multimedia recordings. Ideally, file data has no rules governing content. Any combination of bytes in any order may be stored in the file data. In other words, the user has complete freedom to select the file contents. File data may span adjacent data blocks.

Descriptive data describe the file characteristics or file properties of a corresponding file. For example, descriptive data include characteristics of a file such as a file name, a file creation date, and a file size. Differences may exist in regards to which particular descriptive data are supported and recognized by a given environment. Respective descriptive data are frequently stored in a directory along with the block address of the corresponding file data. A head has descriptive data as defined at the initial time of file creation. A tail has descriptive data as defined at the time of file completion.

The method of the present invention organizes files by encoding certain information into block sizes of data blocks which store the files. Encoding data block sizes may be used to indicate (1) intrablock data organization of a particular data block; (2) interblock data organization of a particular data block relative to a group of data blocks which represent a single file; and (3) file boundaries of each file recorded on a magnetic storage medium.

For intrablock data organization encoding, files are first arranged into data blocks with predetermined data formats and then the block sizes of the data blocks are encoded to indicate a particular format of a data block. Predetermined data formats are an organization of data elements of the present invention such as file data, descriptive data, a head, and/or a tail.

Data block sizes may also indicate interblock relationships under certain circumstances. If a single file is stored in more than one data block, then the block size of each data block comprising the file may indicate the relative location of the data block within the file. For example, if a single file comprises a group of three data blocks, three distinct block sizes may be used to indicate whether any data block is a beginning data block, an intermediate data block, or a last data block in the group.

File boundaries may be indicated by encoding one or more block sizes. A file boundary is the beginning or the end of a particular file. For a group of data blocks representing a single file, two distinct block sizes are necessary to indicate the beginning and the end of file stored in multiple blocks. In contrast, for a single data block representing a file, one distinct block size represents both the beginning and the end of the file. Nevertheless, a minimum of two distinct block sizes is generally required to practice the present invention.

The method of data storage and retrieval is described by two main illustrative embodiments. One embodiment is designated as the "Method for Storage and Retrieval Using Two Data Formats," and the other embodiment is designated as the "Method for Storage and Retrieval Using Four Data Formats." In general, descriptive data and file data arranged must be arranged in at least two specified data formats so that descriptive data may be readily distinguished from file data. However, any number of data formats greater than two may be used to facilitate the storage and retrieval of files.

Method for Storage and Retrieval Using Two Data Formats

Figure 2A:
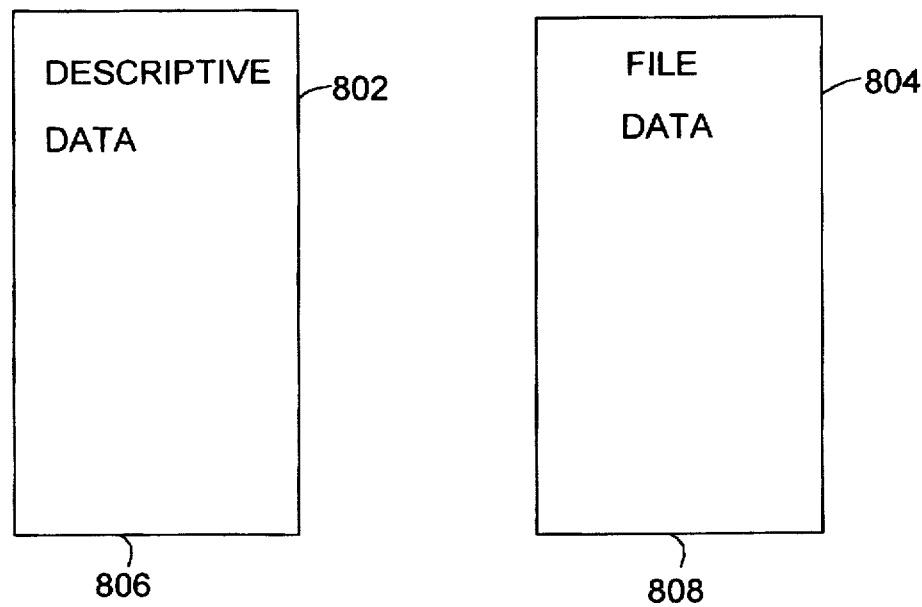
FIG. 2A shows data blocks for the method for storage and retrieval using two data formats.

FIG. 2A through FIG. 5 illustrate the Method for Storage and Retrieval Using Two Data Formats. FIG. 2A illustrates a primary data format 806 and a secondary data format 808. In a preferred embodiment, the primary data format 806 comprises a data block containing descriptive data 802. The secondary data format 808 is a data block only containing file data 804. File data 804 preferably contiguously spans data blocks so that file data 804 is spatially continuous and so that overhead bits are minimized.

Figure 2B:
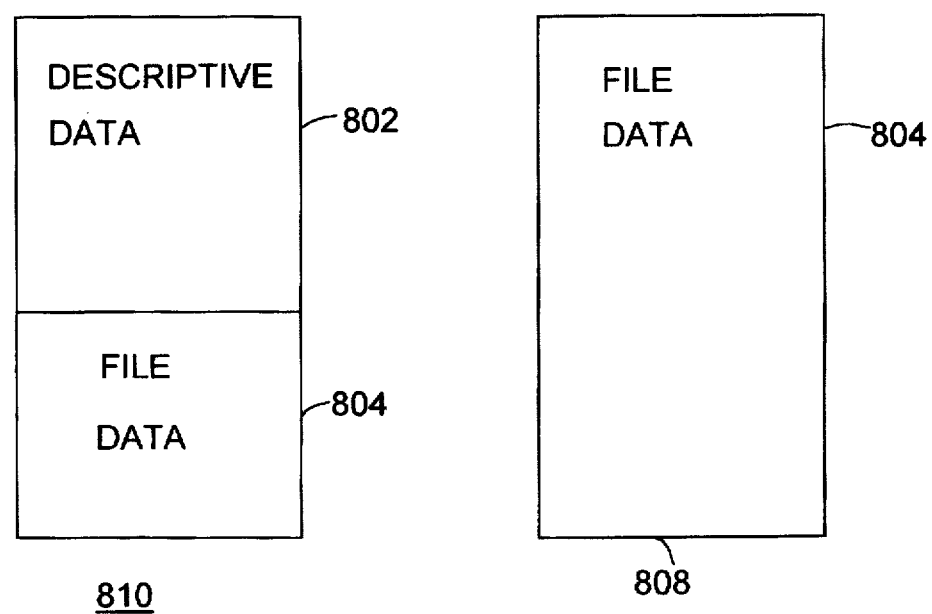
FIG. 2B is an alternative arrangement of data blocks for the method for storage and retrieval using two data formats.

FIG. 2B shows an alternative embodiment of the data organization. In contrast to FIG. 2A, an alternate primary data format 810 of FIG. 2B includes both descriptive data 802 and file data 804. The secondary data format 808 contains file data 804.

FIG. 3A is a chart illustrating two different block length encoding equations 814 which yield a dichotomy of even block lengths or odd block lengths as shown in the block length column 820. In particular, FIG. 3A illustrates a block length encoding equation 814 that assigns an even block length of storage units to the primary data format 806 and an odd block length of storage units to the secondary data format 808. The block length block length encoding equations 814 are stated as follows:

If $Q_R \% 2=0$, then $Q_R=Q_A$; otherwise, $Q_A=Q_R+1$ and

If $Q_R \% 2 \neq 0$, then $Q_R=Q_B$; otherwise, $Q_B=Q_R+1$, wherein $Q_R$ is a raw block length, $Q_A$ is an even block length in the primary data format, $Q_B$ is a odd block length in the secondary data format, and % is the modulo function.

In FIG. 3A the primary data format 806 contains descriptive data 802 which is placed in data blocks with even lengths of storage units (i.e. bits), while the secondary data format 808 contains solely file data which are placed in data blocks with odd lengths of storage units. Filler units are padding which is added to the raw file data or the raw descriptive data to obtain the desired odd or even lengths from the encoding process. Filler units are one or more bits, bytes, arrays, or words. Filler units preferably have a uniform pattern or a uniform predetermined value so that data compression is maximized. For example, if the DCLZ compression algorithm is used, then the filler units may be all low level logic values (i.e. 0's), all high level logic values (i.e. 1's), or a repetitive pattern of bits to increase data compression more than random logic values of padding would permit.

Variations of FIG. 3A are readily apparent. For example, the association of the primary data format 806 and the secondary data format 808 may be reversed from the configuration shown in FIG. 3A so that the primary data format 806 has an odd block length and the secondary data format 808 has an even block length.

The decoding process of FIG. 3B provides the block length decoding equations 816 for decoding blocks encoded pursuant to the encoding equations 814 of FIG. 3A. The block length decoding equations 816 decode even block length data blocks and odd block length data blocks to determine whether a particular data block has the primary data format 806 or the secondary data format 808. The block length (Q) has an even block length of storage units if the block length (Q) modulo 2 equals zero. The block length (Q) has an odd block length 820 of storage units if the block length (Q) modulo 2 does not equal zero. The block length decoding equations 816 are expressed mathematically as:

If $Q \% 2=0$, then $Q=Q_A$ and

If $Q \% 2 \neq 0$, then $Q=Q_B$, wherein Q is block length of a primary data format block or a secondary data format block in storage units, $Q_A$ is an even length data block in the primary data format 806, $Q_B$ is an odd length data block in the secondary data format 808, and % is the modulo function.

In accordance with the present invention, file data 804 may be ignored during any processing, which follows reading of a data block, when the processing of descriptive data 802 is desired. Likewise, descriptive data 802 may be ignored during processing when the processing of file data 804 is desired.

FIG. 4A and FIG. 4B illustrate an alternative embodiment of the Method for Storage and Retrieval Using Two Data Formats. In FIG. 4A, the block length encoding equations 818 encodes the data organization by using two categories of block lengths. A first category of block lengths, $Q_C$, is a quantized integer multiple (n) of the encoding constant (K) as indicated by the block length encoding equation $Q_C=nK$ where n is any nonnegative integer. A second category of block lengths, $Q_D$, is not a quantized integer multiple of the format encoding constant. The second category is described by the block length encoding equation $Q_D=nK+Z$, where n is any positive integer, K is the encoding constant, and Z is a quantization offset which is preferably less than K. Both K and Z represent a number of bits, bytes, or words that comprise block length.

In practice, the association of the primary data format 806 and secondary data format 808 with block lengths may be reversed so that the primary data format 806 has a nonquantized block length of $Q_D=nK+Z$, while the secondary data format 808 has a quantized block length of $Q_C=$ FIG. 4B is a chart illustrating the block length decoding equations 822 which correspond to the block length encoding equations 818 of FIG. 4A. The block length decoding 822 equations are as follows:

If $Q \% K=0$, then $Q=Q_C$ and

If $Q \% K=Z$ or if $Q \% K \neq 0$, then $Q=Q_D$ where Q is a final block length selected from the group consisting of quantized block length $Q_C$ and nonquantized block length $Q_D$, % is the modulo function, K is the encoding constant, and Z is the quantization offset.

In other words, if the remainder of the block length (Q) divided by the encoding constant (K) is zero, then the data organization 812 is in the primary data format 806 which includes descriptive data 802 and may optionally include file data 804. In contrast, if the remainder of the block length (Q) divided by the format encoding constant (K) is nonzero or equal to the quantization offset (Z), then the data organization 812 is in the secondary data format 808.

Additional encoding schemes, using two data formats, other than those explicitly set forth in the specification are possible. For example, the primary data format may be assigned to a fixed block size, while the secondary data format is any variable block size not equal to the assigned fixed block size. Filler units (i.e. supplemental bits) are added to a data block to insure that the primary data format does not have the same block size as the secondary data format.

Note that the block length encoding chart of FIG. 3A and FIG. 4A, as well as the block length decoding chart of FIG. 3B and FIG. 4B, may be stored as a relational database. In other words, the software program of the present invention may use a relational database to assist in associating particular data formats with encoding operations or decoding operations. The relational database may also contain rules which govern the formation or reading of the resultant data organization.

Encoding Process for Two Data Formats

Referring to FIG. 5, the start of the encoding process is indicated by reference numeral 50. In reference block 52, a maximum allowable data block size is defined. The maximum allowable data block size is limited by hardware considerations such as buffer size of the I/O interface 14 (FIG. 1).

At reference numeral 54, a file is inputted into the computer and file size is determined. The file size is determined by reading the file, by reading a portion of the file containing file size information, or by referencing file size information stored by the operating system. New file creation is often indicated by the operating system after a user has requested to save a new file in an application program. The operating system typically provides the starting address and the closing information concerning the newly created file.

In reference block 830, the file is assigned a data format depending upon file characteristics such as the file size, the presence of file data and/or the presence of descriptive data. Either a portion of the file or the entire file is placed into a data block.

For example, referring to FIG. 2A in conjunction with FIG. 5, the data format is assigned to a newly formed data block based upon the presence or absence of file data and/or descriptive data in a file. If the file or a portion of a file only contains file data 804 then data block storing the file or the portion is assigned to the secondary data format 808. In contrast, if the file or a portion of the file only contains descriptive data, then the data block storing the file or the portion is assigned the primary data format 806. A single file is necessarily stored in two or more data blocks if descriptive data and file data are placed in separate blocks as shown in FIG. 2A.

Alternatively, referring to FIG. 5 in conjunction with FIG. 2B, the file may be organized into one data block or multiple data blocks based upon file size. For example, if the file size is smaller than the maximum allowable block size, the file is organized into a single block in the alternate primary data format 810 which contains both descriptive data 802 and file data 804. However, if the file size were greater than the maximum allowable block size then the file would be organized into a series of data blocks.

In block 832, the data format assigned in block 830 is associated with a distinctive data block size or with a plurality of permissible data block sizes based upon a block length encoding equation. The encoded data block sizes can be determined according to one of the following schemes:

(1) Each data block has either an even block length or an odd block length (i.e. FIG. 3A), (2) Each data block has either a quantized block size (i.e. equal to an integer multiple of a constant) or a nonquantized block size (i.e. FIG. 4A), or (3) Each data block has a permissible and distinguishable quantized data block length.

That is, the data block length for each data format may only assume specific quantized values, discrete values, or specific interval values.

Reference numeral 62 indicates the end of the encoding process.

Method of Storage and Retrieval Using Four Data Formats

The method for storage and retrieval of the present invention may use any number of distinguishable data block lengths greater than or equal to two unique data block lengths. The number of distinguishable block lengths depends upon the practical applications of the file system. Four data formats facilitate the storage and retrieval of files of divergent sizes. If desired, additional data formats may be used to represent the identity of the creator of the file data or the identity of application program that created the file data. The four data formats are defined in terms of block composition and block lengths as shown in FIG. 6 through FIG. 10.

Four Data Formats—Block Composition

Data block composition refers to (1) the data elements which comprise data blocks and (2) the arrangement of those data elements which comprise data blocks. The basic data elements of data blocks for the Method of Storage and Retrieval using Four Data Formats are (1) head, (2) optional file data, and (3) tail. Distinct arrangements (i.e. combinations) of basic data elements may be categorized into data formats.

The head 102 may only be located at the beginning of a data block as shown in FIG. 6. The head 102 contains descriptive data associated with a given file which is available at the initial time of file creation. The head 102 contains the correct name of the file provided that the name of the file is not changed after initial file creation. The head 102 does not usually contain the file size, the total length of the optional file data 104, or the exact address of the tail 108. Similarly, the head 102 does not usually contain the total number of data blocks belonging to a group of data blocks.

For a group of multiple blocks representing a single file, the head 102 preferably contains information on a uniform block size for data blocks solely containing optional file data 104. The head 102 preferably contains the exact offset (i.e. block address) of the file data 104 with respect to the beginning of a group of data blocks.

The tail 108 may only be located at the end of a data block as shown in FIG. 6. The tail 108 contains descriptive data associated with a given file available after initial completion of a file. Descriptive data include file name, file creation data, last file modification date, file size, or the like. In contrast to the descriptive data contained in the head 102, the tail 108 usually contains additional descriptive data which are only available after a complete file has been created. If the head 102 and the tail 108 contain different values of the same descriptive data, the tail value of the descriptive data will preempt the head value and govern the outcome. Accordingly, the while the tail 108 is essential the head 102 may be deleted from the four format data system.

In a preferred embodiment, the tail 108 always contains the total length of the file data and the head address of the head 102. The head address refers to the position of head 102 at the beginning of a group of blocks or at the beginning of an individual data block. The data organization enables blocks to be conveniently generated in real-time without any cumbersome predeclaration of data size.

Optional file data 104 is located in the intervening position between the head 102 and the tail 108; preferably so that the file data 104 remains spatially continuous. Spatially continuous means that file data is not interrupted or fragmented by any data storage units that contain intervening referencing information or padding. In addition, padding 106 may be located between the head 102 and the file data 104 or between the tail 108 and the file data 104. The padding 106 is preferably located between the tail 108 and the file data 104. Padding 106 (i.e. padding bits, bytes, or words) is added to the file data 104 to optimize the file data length and ultimately the data block length. An external reference called a file directory may be added to provide information regarding the location of a head or tail.

FIG. 6 illustrates four data blocks incorporating four different data formats. Each data format includes one or more of three fundamental components: (1) a head 102, (2) file data 104, and (3) a tail 108. FIG. 7A is a chart which summarizes the structural elements 84 associated with the four data formats.

As indicated in FIG. 6, the first data format 110 comprises a data block having a head 102, optional file data 104, and a tail 108. A data block in the first data format 110 begins with a head 102 followed by optional file data 104. The first data format 110 ends with a tail 108. Padding 106 (i.e. filler units) may be added between the head 102 and the optional file data 104 or between the file data 104 and the tail 108 to adjust the length of the data block. The first data format 110 is preferably used when representing a single respective file by a single corresponding data block.

The second data format 210 comprises a data block having a head 102 and optional file data 104. A data block in the second data format 210 begins with a head 102 followed by optional file data 104. If optional file data 104 is not present in the second format 210, then the block will merely contain a head 102.

The second data format 210 (beginning data format) is preferably used when representing a single file by multiple data blocks. For a group of data blocks, which represent a single file, the second data format 210 (beginning data format) is assigned to a beginning data block of the group. The beginning data block has a beginning block size. The beginning block typically stores a beginning portion of the file.

The third data format 212 (end data format) comprises a data block having optional file data 104 and a tail 108. A data block in the third data format 212 begins with optional file data 104 and ends with a tail 108. If the optional file data 104 is not present in the third data format 212, the data block will have only a tail 108.

The third data format 212 (intermediate data format) is preferably used when representing a single file by multiple data blocks. For a group of blocks, which represent a single file, the third data format 212 (end data format) is assigned to a last data block of the group. The last data block has a last block size. The last data block typically stores an end portion of the file.

The fourth data format 306 comprises a data block having only file data 104. The fourth data format 306 is preferably used when representing a single file by a group of data blocks. The fourth data format 306 (intermediate data format) is assigned to an intermediate data block of the group. The intermediate data block has an intermediate block size. The intermediate block size typically stores an intermediate portion of the file.

In accordance with the above data organization, files are optimally recorded in a data block or a group of blocks one after another without any intervening filemarks or setmarks. A file may occupy as few as one data block, or a file may span over as many blocks as necessary to accommodate the optional file data 104 and/or descriptive data. As few blocks as possible are preferably used to represent the file. For space economy and simplicity of retrieval, when a file is split into to two or more blocks, none of the blocks except possibly the beginning data block and the last data block contain any referencing data. Referencing data is descriptive data or data other than the file data. File data 104 is preferably spatially continuous within any data block without any intervening filler units, padding, filemarks, setmarks, or otherwise. File data 104 contiguously spans adjacent data blocks for a single file represented by multiple data blocks.

FIG. 7A is a chart that summarizes the association of data elements 84 with corresponding data format names 80. "Yes" indicates the presence of a data element 84 in a particular data format and "No" indicates the absence of a data element 84 in a particular data format. "X" indicates a "don't care state," meaning that either the presence or the absence of file data 104 is permitted in the particular data format.

Four Data Formats—Quantized Block Lengths

The four format data scheme having quantized data block lengths is also referred to as the Yabumoto Encoding Scheme (YES). YES uses data block size to facilitate storage and retrieval of information on a magnetic storage medium. FIG. 7B is a chart that indicates the permissible data block lengths (i.e. $Q_3$, $Q_2$, $Q_1$, and $Q_0$) for each data format in terms of data block length encoding equations 82. All block lengths in the four format data scheme are optimally integer multiples of C bytes, bits, or words. Hence, the data blocks have distinct quantized block lengths.

Each respective data block is quantized in data block size based upon permissible quantized data block sizes associated with a corresponding data format. A data format name 80 is listed on the far left along the vertical axis of the chart of FIG. 7B. Proceeding to the fight, data block length encoding equations 82, which define permissible quantized data block sizes, are listed in an adjacent column of the chart.

The number of data format variations (V) is equal to the pitch interval (P) divided by the format encoding constant (C). In FIG. 7B, there are four permissible data formats; V equals 4 for each block length encoding equation 82. The pitch interval (P) generally describes the minimum allowable size for file data 104 in storage units (i.e. bits, bytes, or words). The format encoding constant (C) is generally less than the pitch interval (P). In other words, P/C should be greater than one, because two or more data formats are required. The format encoding constant (C) defines the granularity of the block size. The pitch interval (P) is an integer multiple of the format encoding constant.

In the illustrative example of FIG. 7B, the first data format 110 is preferably associated with a first quantized block length, the first quantized block length equals $Q_3=3C+mP$, wherein C is the format encoding constant, P is the pitch interval, P/C equals 4, and m is a nonnegative integer. The second data format 210 is preferably associated with a second quantized data block length, which is also called the beginning block size. The second quantized block length equals $Q_2=2C+mP$, wherein C is the format encoding constant, P is the pitch interval, P/C equals 4, and m is a nonnegative integer. The third data format 212 is preferably associated with a third quantized block length, which is also called the last block size. The third quantized block length equals $Q_1=C+mP$, wherein C is the format encoding constant, P is the pitch interval, P/C equals 4, and m is a nonnegative integer. The fourth data format 306 is preferably associated with a fourth quantized block length, which is also called the intermediate block size. The fourth quantized block length equals $Q_0=mP$, wherein P is the pitch interval and m is a nonnegative integer. If the fourth data format represents a single file, then the intermediate block size for the data blocks may be kept uniform (i.e. fixed relative to one another) for convenience.

In practice, the block length encoding equations may be associated with different data formats then specifically delineated in FIG. 7B. Nevertheless, the first quantized block length, the second quantized block length, the third quantized block length, the fourth quantized block length must permit each data format to be distinguished from other data formats. The above block length encoding equations may, for instance, set C equal to 128 bytes and P equal to 512 bytes. However, if the present invention is used in conjunction with a magnetic storage device (i.e. 16 in FIG. 1), such as a hard disk drive, using Fixed Block Architecture (FBA), then encoded data block lengths are restricted to integer multiples of sector length.

While FIG. 7B describes data blocks with four different data formats, in actual practice, any number of data formats greater than two is permissible. Consequently, permissible data block length codes are generally described by the mathematical expression of $Q_j=mP+jC$, where m is any nonnegative integer, P is the pitch interval, j is an integer selected from the series of j=0 (V−1), C is the format encoding constant, $Q_j$ is a quantized block size. V is the number of variations in encoded data formats which is equal to P/C.

In order to obtain quantized block lengths indicative of the data format, the head length, the tail length, and the file data length may be restricted to discrete values. Restricting the head length, the tail length, and the file data length to permissible values is accomplished by adding filler units or padding to the raw file sizes. Filler units are supplemental bits, words, or bytes. Calculation of the relative addresses of the head 102, file data 104, and tail 108 is facilitated when the head length, the file data length, and the tail length are restricted to permissible values. However, the present invention may be practiced without restricting the head length, the tail length and/or the file data by merely manipulating the total resultant block size directly with filler units.

In one embodiment, the head 102 has a head length of 2C, the tail 108 has a tail length of C and the file data 104 has a length of mP, where m is a nonnegative integer, P is the pitch interval, C is format encoding constant. If C equals 128 bytes, a permitted head length would be 256 bytes and a permitted tail length would equal 128 bytes. File data length could be equal to the pitch interval (P) of 512 bytes for four variations data format because P=VC.

Figure 9:
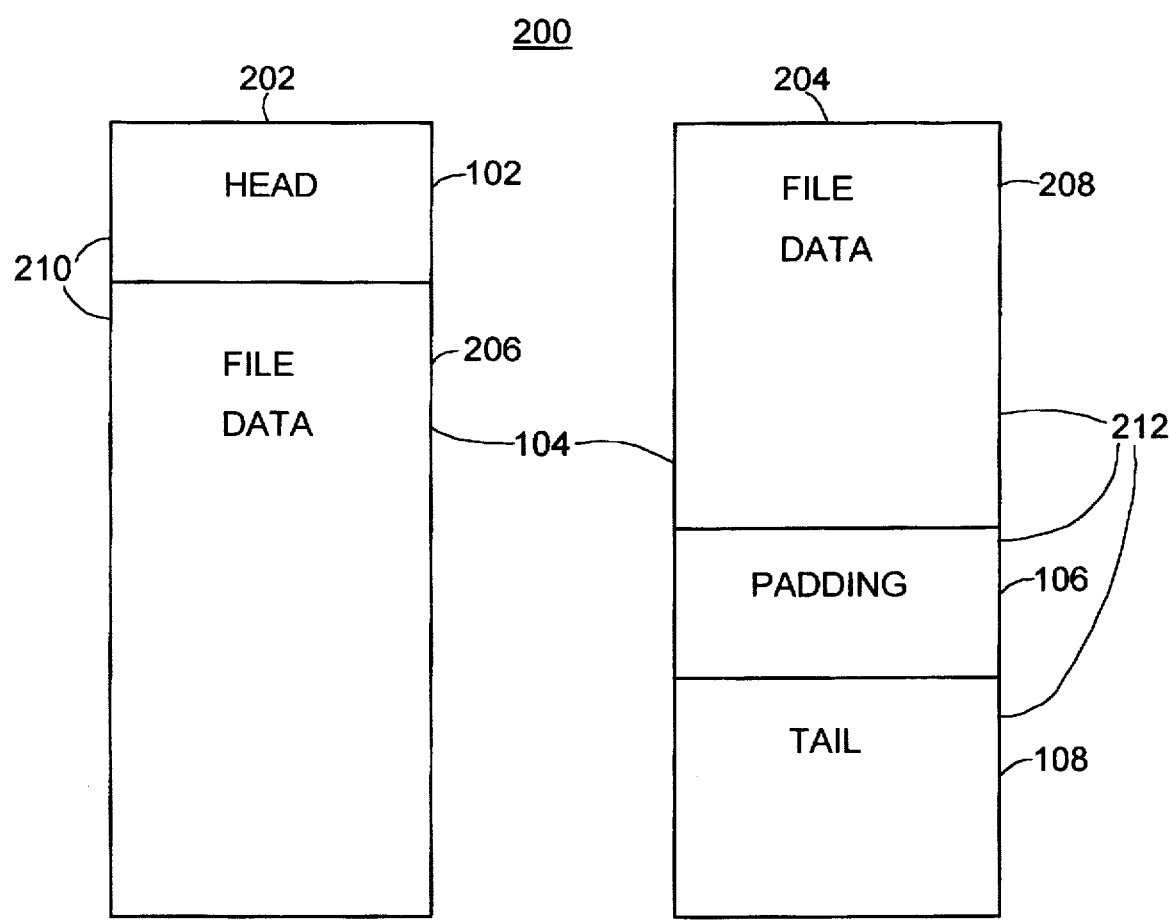
FIG. 9 shows a group of data blocks containing a medium length file.
Figure 10:
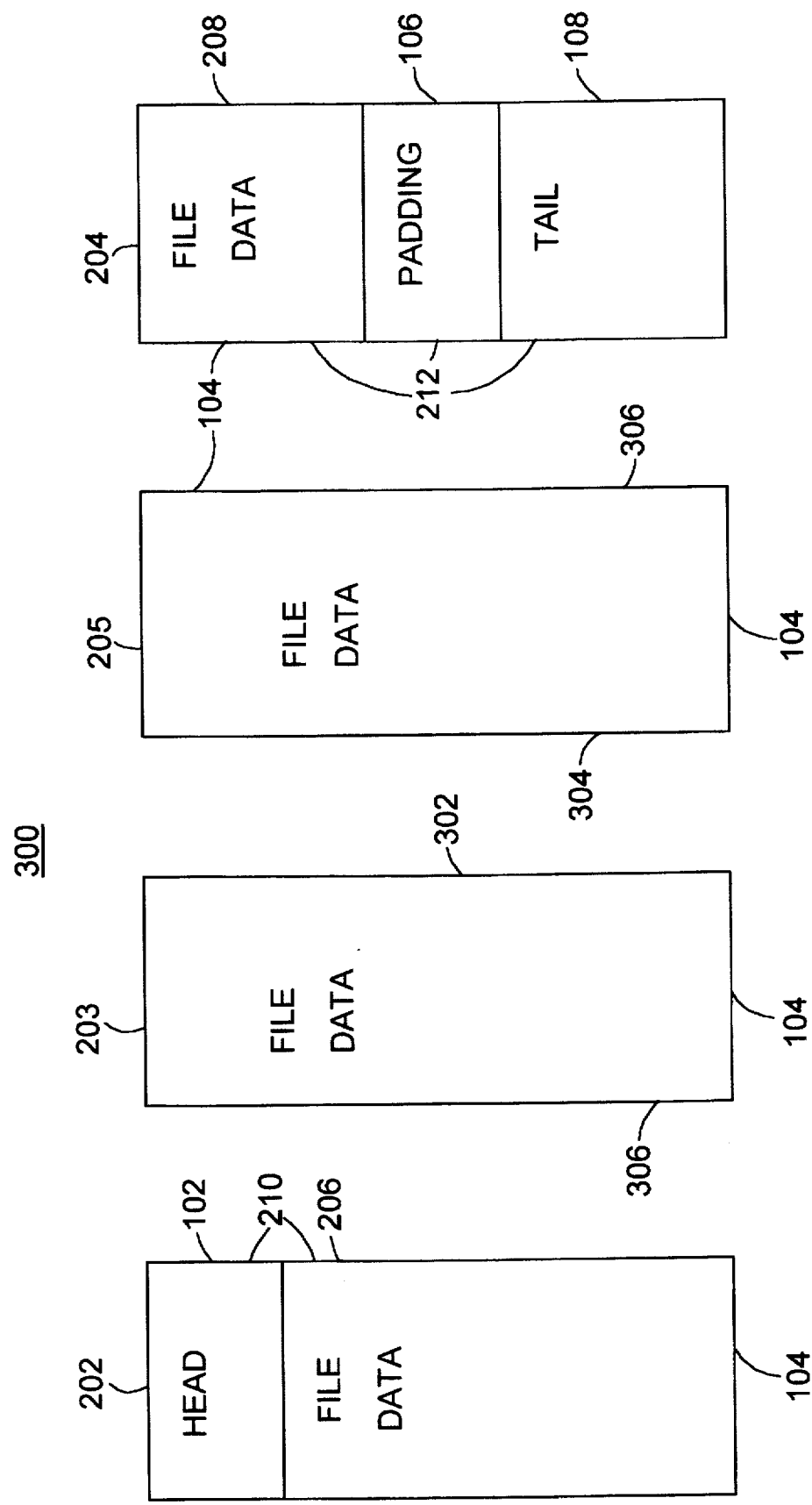
FIG. 10 shows a group of data blocks containing a large length file.

FIG. 8, FIG. 9, and FIG. 10 depict data formats associated with a small size file, a medium size file, and a large file, respectively. The designations "small file," "medium file," and "large file" signify relative size among the files. In FIG. 8 a small file 100 is represented by one data block in a first data format 110. The first data format 110 has a head 102, optional file data 104, optional padding 106, and a tail 108. In addition, filler units may be present in the head 102 and the tail 108 to adjust the head length and the tail length, respectively. The file data 104 is preferably followed by padding 106 to optimize the length of the file data 104 and the block length of the data block.

In FIG. 9 a medium file 200 is represented by two blocks, beginning data block 202 and a last data block 204. The beginning data block 202 has a second data format 210 (beginning data format). The last data block 204 has a third data format 212 (end data format). The second data format 210 has a head 102 and optional file data 104. The head 102 may contain filler units to adjust the raw length of the head 102. Note that the second data format 210 preferably does not include padding at the end of the first data block 202 in order to keep the file data 104 continuous. The second data format 210 includes a beginning portion 206 of the file data 104.

The last data block 204, which is in the third data format 212, has an end portion 208 of the file data 104, optional padding 106, and a tail 108. The end portion 208 of the file data 104 is preferably followed by padding 106 to optimize the length of the file data 104. Filler units may be present in the tail 108 to adjust the raw tail length as well as the total block length of the last data block 204.

In FIG. 10, the large file 300 has a beginning data block 202, a second data block 203, a third data block 205, and a last data block 204. The beginning data block 202 of the large file 300 is substantially identical to the beginning data block 202 of the medium file 200. Likewise, the last data block 204 of the large file 300 is substantially identical to the last data block 204 of the medium file 200.

The second data block 203 and the third data block 205 each have a fourth data format 306. The fourth data format 306 includes file data 104 stored in one or more intermediate data blocks. As shown in FIG. 10, the optional file data 104 is distributed among three blocks in a beginning portion 206, a first intermediate portion 302, a second intermediate portion 304, and an end portion 208. Padding 106 is preferably only present after the end portion 208 of the file data as shown in FIG. 10. In other words, the file data 104 is contiguous without intervening padding units (i.e. bits).

In sum, groups of blocks representing a single file, such as a medium file or a large file, each have a head 102, file data 104, and a tail 108. The block length of each block in the group inherently contains information regarding the relative position of the data block within the group, because the positions of data blocks of different formats are restricted within a group of blocks. For example, a file represented by a group of blocks, as opposed to a single data block, starts with a beginning data block 202 in the second data format 210. In addition, a file represented by a group of blocks ends with a last data block 204 in the third data format 212. Maintaining a minimum of one file per data block or prevents file fragmentation, but multiple files could be placed into a data block.

Four Data Format Encoding Scheme

Figure 12A:
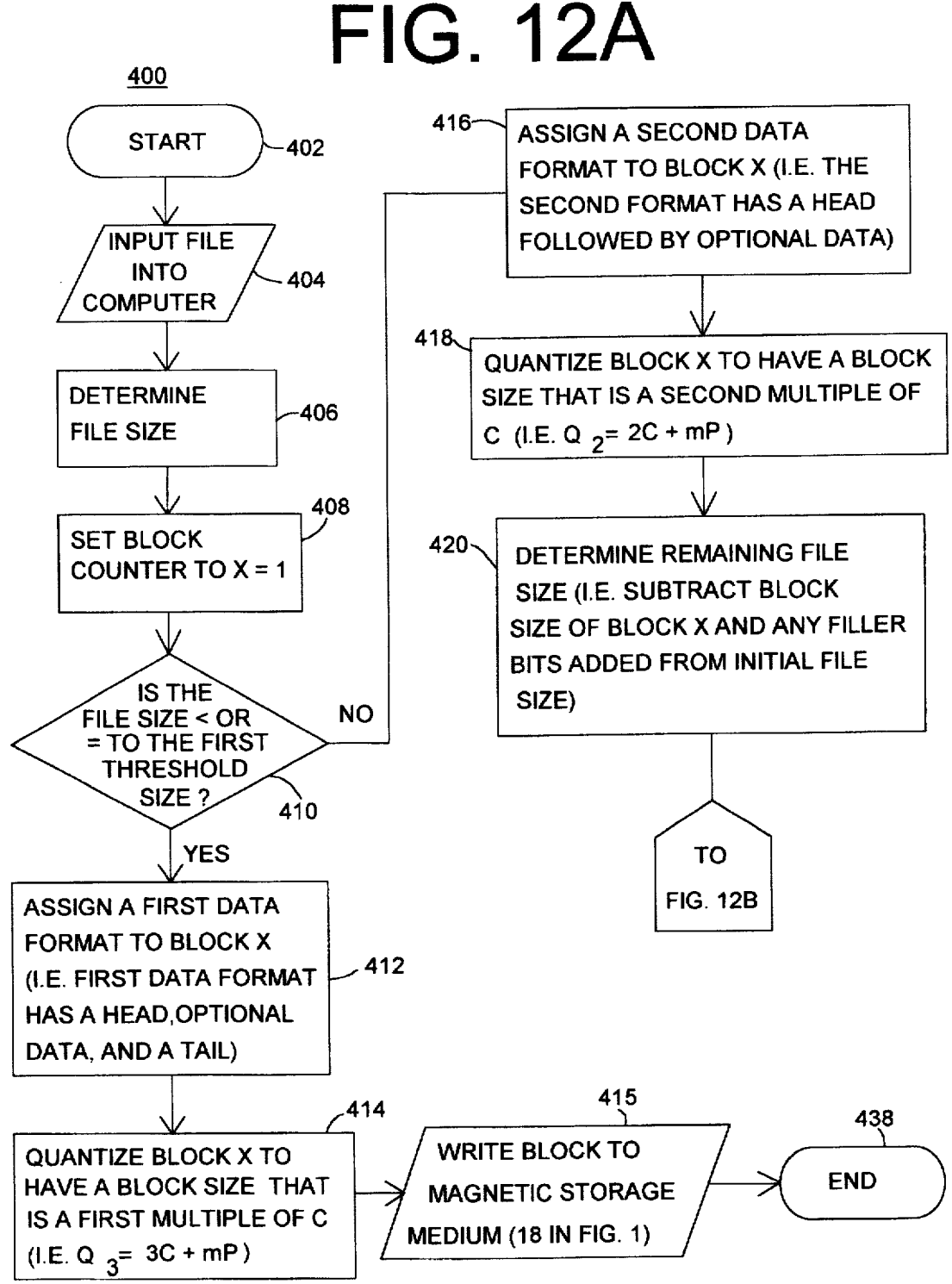
FIG. 12A and FIG. 12B are a flow chart of the encoding process for the specific case where four different data formats are used.
Figure 12B:
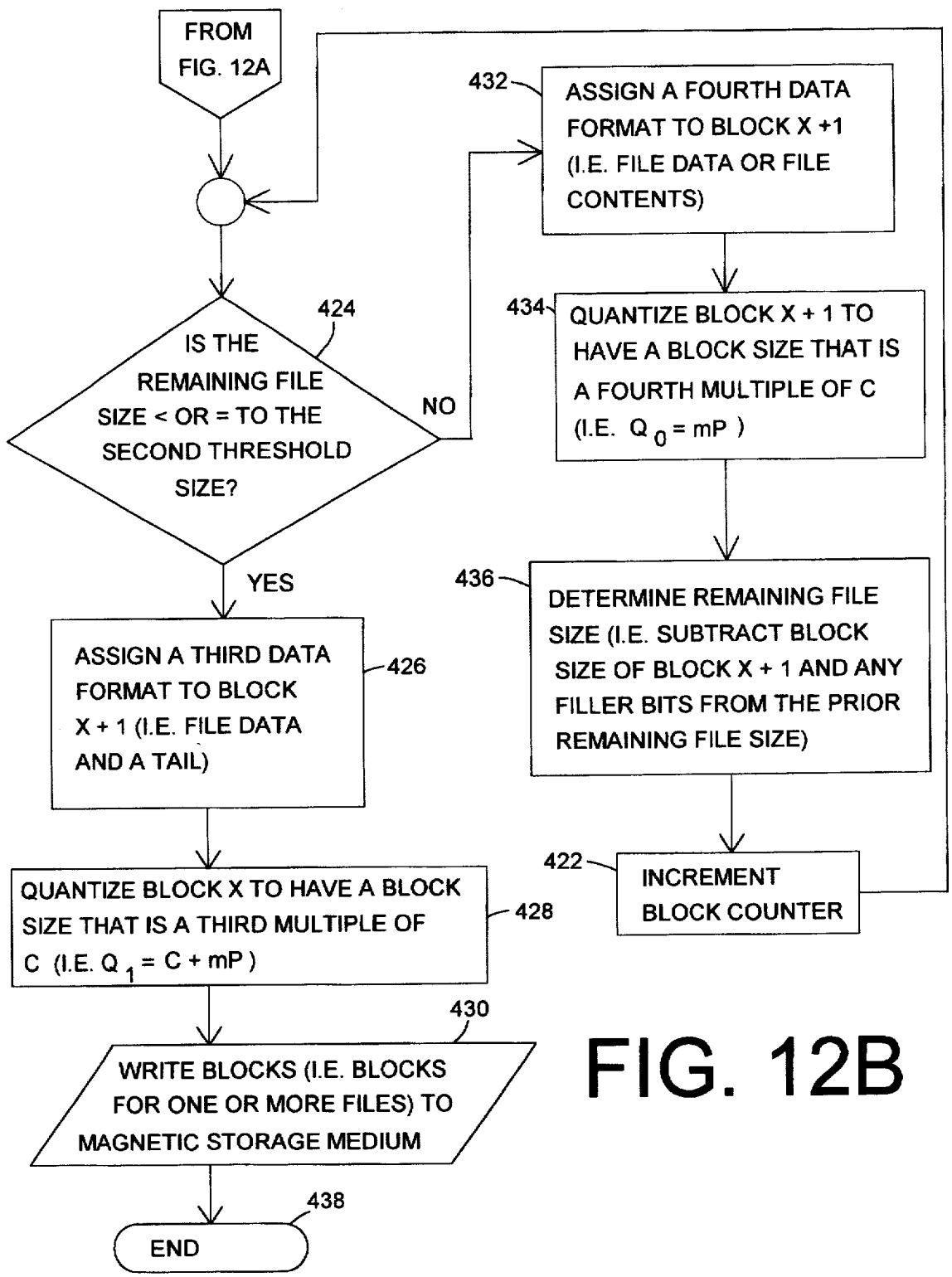

FIG. 11 is a block diagram generally illustrating the steps to encoding wherein file size determines the data format assigned. FIG. 12A and FIG. 12B are a flow chart illustrating the encoding process in more detail than FIG. 11. Referring to FIG. 11, the start of the encoding process is indicated by reference numeral 50. In reference block 52, a maximum allowable data block size is defined. The maximum allowable data block size is limited by hardware considerations such as buffer size of the I/O interface 14 (FIG. 1). The maximum allowable block size may be, for example, 16,384 bytes.

At reference numeral 54, a file is inputted into the computer and file size is determined. The file size is determined by reading the file, by reading a portion of the file containing file size information, or by referencing file size information stored by the operating system. The file may be virtually any application program file. In addition, the file may be a digital audio recording, a digital video recording, or a multimedia recording. In reference block 56, the file size of the file, which was inputted into the computer, is compared to the maximum allowable block size.

In block 58, a data format is assigned to a newly formed data block based upon the comparison in block 56 and a file or a portion of the file is placed into the data block. The file is organized into one data block if the file is smaller than the maximum allowable block size. If the file size is greater than the maximum allowable block size then the file is organized into a series of data blocks. In other words, a portion the file is placed into a data block if the file size is greater than the maximum allowable block size. For example, if the file size is smaller than the maximum allowable data block size, minus an overhead margin for adding filler units, padding and/or descriptive data, then the entire file may be placed into a data format in a single data block. On the other hand, if the file size is greater than the maximum allowable data block size after considering the above overhead margin, then the file may be placed into a data format encompassing multiple blocks. The file data of a multiblock file optimally contiguously spans the data block boundaries without intervening referencing data.

In reference block 60, information identifying the format assigned in reference block 58 is encoded into the data block size (i.e. data block length). The data format assigned in reference block 58 is associated with a particular distinctive data block length or a plurality of permissible data block lengths. The plurality of permissible data block lengths can be determined from a mathematical expression, such as the data block length encoding equations 82 of FIG. 7B. In accordance with the block length encoding equations 82, each data format assigned is associated with quantized block lengths. That is, the data block length for each data format may only assume quantum values, discrete values, or specific interval values which are multiples of the encoding constant. Reference numeral 62 indicates the end of the encoding process.

FIG. 12A in conjunction with FIG. 12B illustrates the encoding process 400 in more detail than FIG. 11 for the case where four distinct data formats are used. The encoding process starts at reference numeral 402. A file is inputted into the computer at reference numeral 404. In reference block 406, the file size of the file, which was previously inputted, is determined by reading the file or otherwise. In block 408, the data block counter is set to X equals one. That is, "X equals one" refers to the first data block to be created in accordance with the encoding method.

At reference numeral 410, the file size is compared to a first threshold size. The first threshold size is a modified maximum allowable block size and the first threshold size is derived from the maximum allowable block size. The first threshold size is equal to the maximum allowable data block size minus overhead units. Overhead units are overhead bits, overhead bytes, overhead arrays, or overhead words. Overhead units are memory locations in data blocks reserved for adjusting (i.e. quantizing) of the length of data elements, such as file data, heads, and/or tails. The first threshold size is preferably equal to the maximum allowable data block size minus the following types of overhead units: (1) overhead head units, (2) overhead tail units, and (3) overhead file data units.

Referring to FIG. 7B in conjunction with FIG. 12A, if the file size is less than or equal to the first threshold size, then a first data format 110 is assigned to data block X (i.e. the first data block) in reference block 412. The first data format 110 includes a head 102, optional data 104, and a tail 108. However, if the file size is greater than the first threshold size, the a second data format 210 is assigned to data block X as shown in data block 416. The second data format 210 includes a head followed by optional data.

If the first data format 110 was assigned in block 412, then the encoding process proceeds to reference numerals 414, 415, and to the end 438. In reference block 414, the block length of data block X is quantized to have a data block size equal to $Q_3=3C+mP$, wherein $Q_3$ is the quantized data block size, C is the format encoding constant, P is the pitch interval, and m is any nonnegative integer. In block 415, the quantized data block is written to a magnetic storage medium 415.

If the second data format 210 was assigned in block 416, then the encoding process proceeds to reference numerals 418, 420, and then to FIG. 12B. In block 418, the data block size of data block X is quantized to equal $Q_2=2C+mP$, wherein $Q_2$ is the quantized data block size, C is the format encoding constant, P is the pitch interval, m is any nonnegative integer.

In reference block 420, the remaining file size is determined. That is, the remaining file size which remains after a portion of the file information is placed into data block X. Remaining file size may be calculated by subtracting the data block size of data block X and any filler units or padding added to data block X in the quantization process of block 418. A detailed explanation of adding filler units or padding in the quantization process is provided subsequently in this specification.

Turning to reference numeral 424 in FIG. 12B, the remaining file size determined in block 420 is compared to a second threshold size. The second threshold size is a modified maximum allowable block size. The second threshold size is equal to maximum allowable data block size minus overhead tail units and overhead file data units. Referring to FIG. 7B in conjunction with FIG. 12B, if the remaining file size is less than or equal to the second threshold size, then a third data format 212 is assigned to data block X+1 in block 426. The third data format 212 includes optional file data 104 and a tail 108. If, however, the remaining file size is greater than the second threshold size, then a fourth data format 306 is assigned to data block X+1 in block 432.

If the third format was assigned in block 426, then the data block size of data block X+1 is quantized to have data block size $Q_1=C+mP$, wherein $Q_1$ is the quantized data block size, C is the format encoding constant, P is the pitch interval, m is any nonnegative integer.

At reference numeral 430, the data block X and data block X+1, which are data blocks corresponding to the same file, are written to the magnetic storage medium 18 (FIG. 1). Alternatively, blocks from more than one file are stored in a write buffer for prospective write operations to the magnetic storage medium.

If the fourth format 306 was assigned to data block X+1 in block 432, then the data block length of data block X+1 is quantized to have a data block size of $Q_0=mP$, wherein $Q_0$ is the quantized data block size, C is the format encoding constant, P is the pitch interval, and m is any nonnegative integer.

In block 436, the remaining file size is determined. The remaining file size may be determined by subtracting the data block size of data block X+1 and any filler units or padding added during the quantization process of block 434 from the previous remaining file size, which was determined in reference block 420.

In block 422, the data block counter is incremented by one. In other words, X is increased by one for each subsequent loop through reference block 422. The encoding process is repeated via reference block 422 to reference block 424, so that large files containing many data blocks of file data only can be accommodated. The encoding process is repeated for intermediate blocks containing file data only until the last data block for a file is reached. When the last data block for a file is reached, the remaining file size is, by definition, less than or equal to the second threshold file size according to the comparison at reference numeral 424. The last data block has the third data format (end data format) in accordance with blocks 426, 428, and 430. The encoding process terminates at an end 438.

Figure 12C:
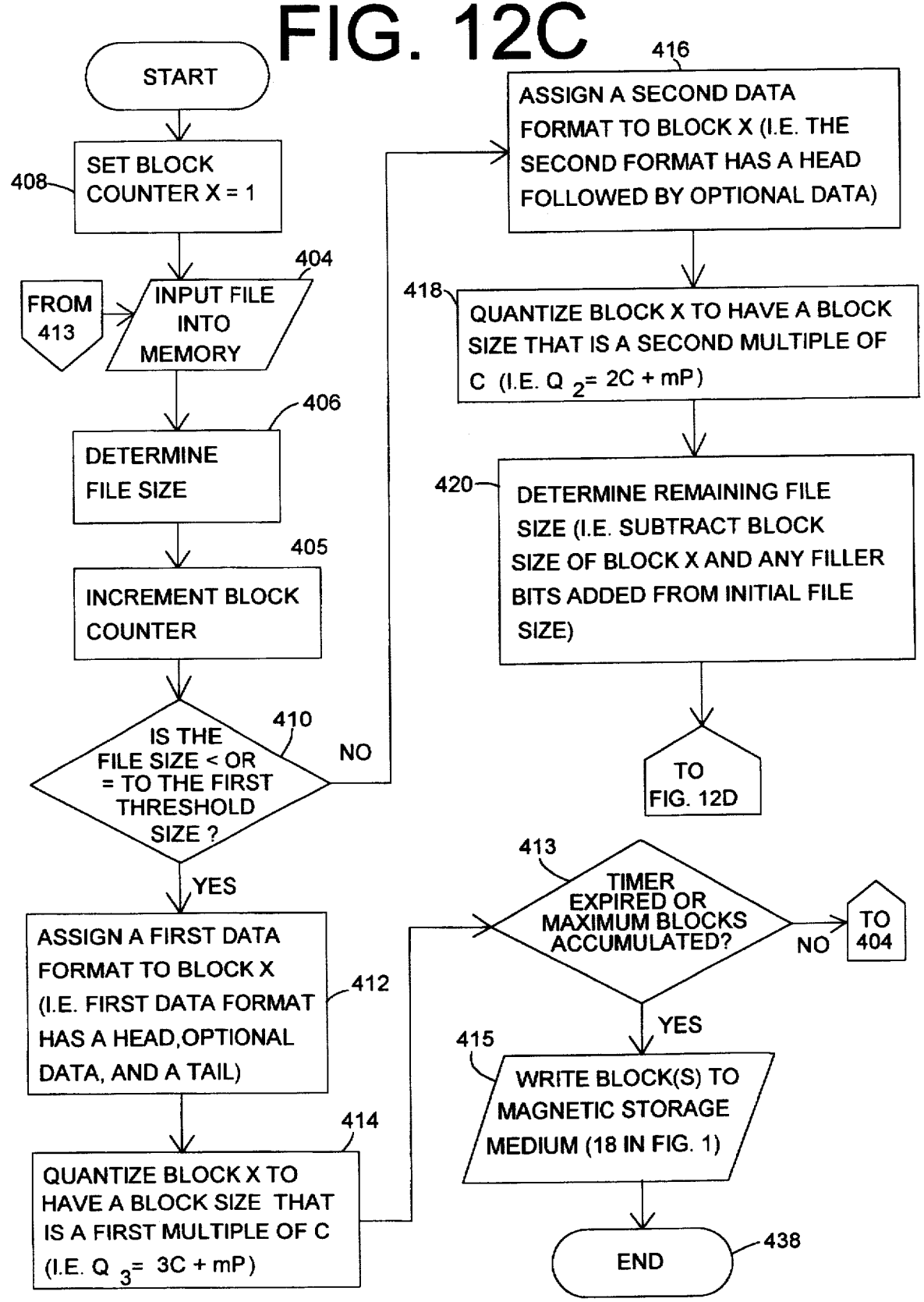
FIG. 12C and FIG. 12D illustrate an encoding process of FIG. 12A and FIG. 12B modified for writing of multiple blocks or a single block after a timer has expired or after a maximum number of blocks has been accumulated.
Figure 12D:
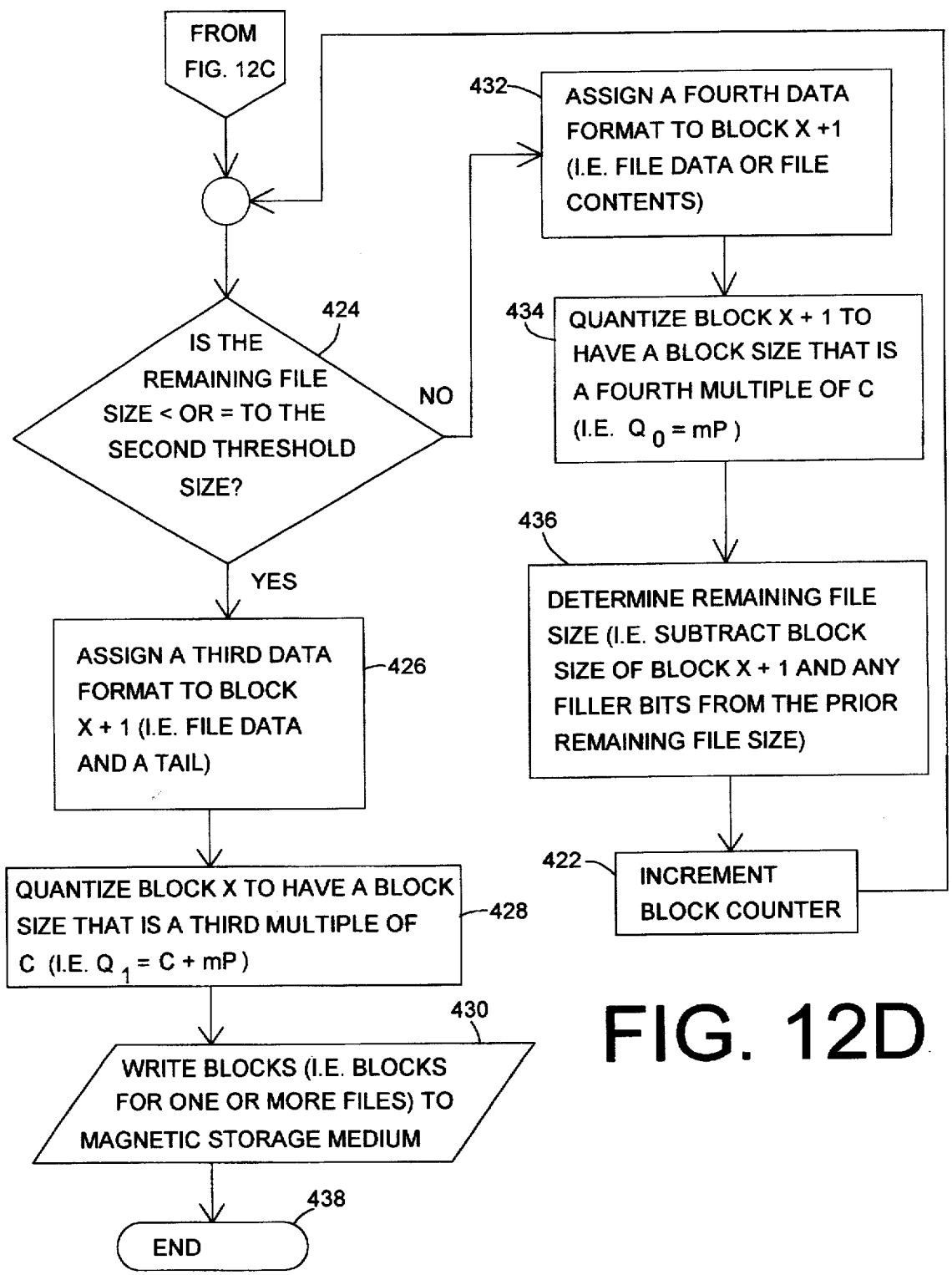

While a single execution of the encoding process terminates at the end 438, the process may be repeated for additional blocks beginning at start 402. FIG. 12C and FIG. 12D illustrate an encoding process of FIG. 12A and FIG. 12B modified for subsequent executions of the encoding process. Subsequent executions of the encoding process may generate additional blocks for writing multiple blocks as a batch at reference numeral 415. The batch is accumulated by including a conditional writing statement into the encoding process. Writing at reference numeral 415 does not occur until a either of the following conditions first occurs at reference numeral 413: (1) a predetermined duration has elapsed (i.e. a timer has expired) or (2) until a predetermined number of blocks has accumulated in memory 10 (FIG. 1) or in the write buffer memory associated with the magnetic storage device 16 (FIG. 1) If neither of the above conditions has occurred and additional files are inputted at reference character 404, then the encoding process may repeat starting at block 406. In block 405, the block counter is incremented by incrementing X.

Note that the writing in block 415 may include writing either a single data block or multiple data blocks as a batch. Writing multiple data blocks is advantageously efficient in minimizing gaps between blocks on the magnetic storage medium (i.e. digital tapes and streaming tapes). As a result, the storage density of bits per unit area on the magnetic storage medium 18 (FIG. 1) can be increased.

Quantization Processes

Figure 14:
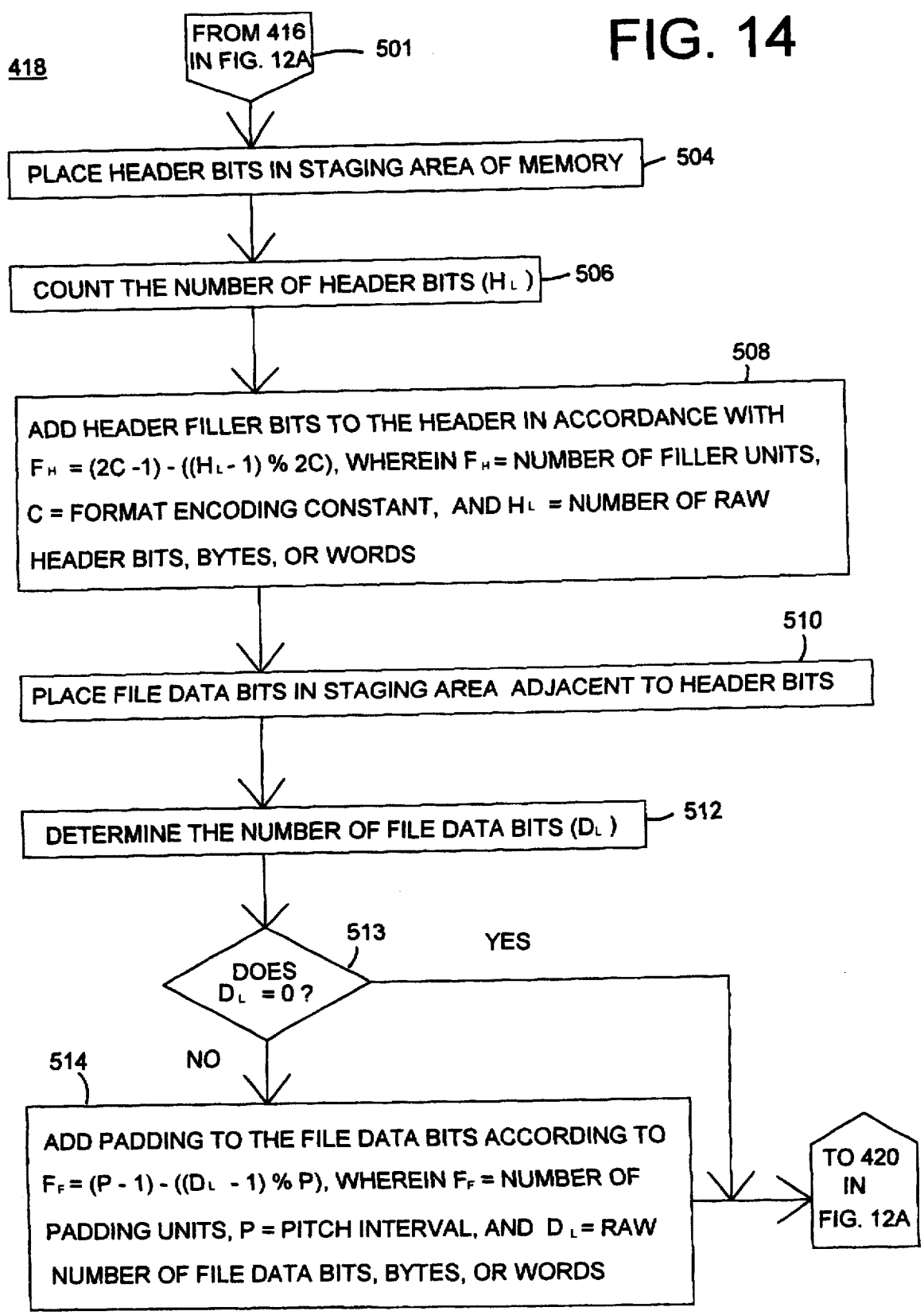
FIG. 14 is a flow chart illustrating the quantization of data block size for the second data format in more detail than FIG. 12A shows.
Figure 16:
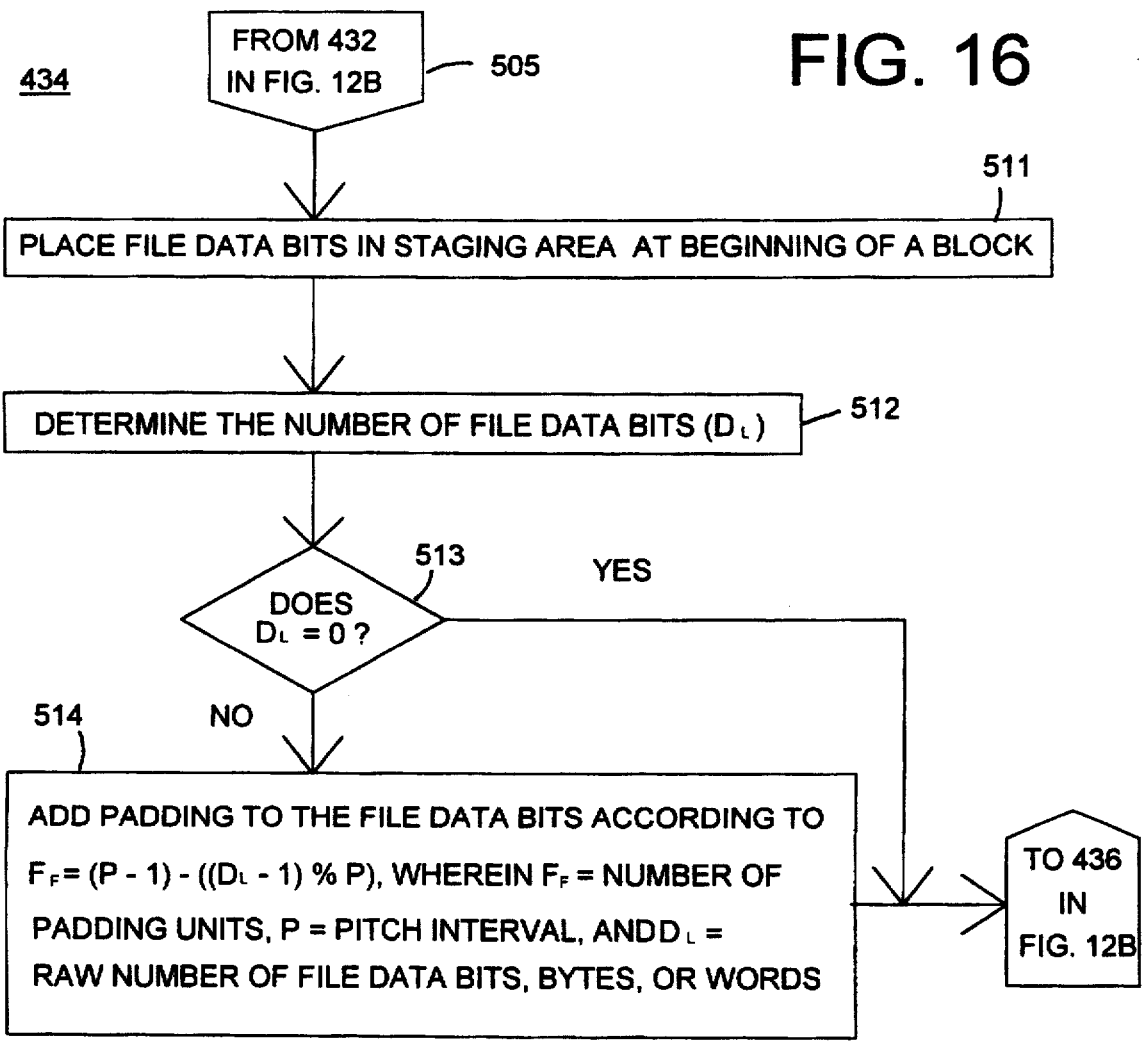
FIG. 16 is a flow chart illustrating the quantization of data block size for the fourth data format in more detail than FIG. 12B shows.

Recall that the quantization processes were previously represented as individual blocks 414, 418, 428, and 434 in FIG. 12A and FIG. 12B. FIG. 13A in conjunction with FIG. 13B shows a detailed version of block 414 in FIG. 12A, quantization of the first data format 110 (FIG. 7B). FIG. 14 shows a detailed version of block 418 of FIG. 12A. FIG. 15A in conjunction with FIG. 15B shows a detailed version of block 428 of FIG. 12B, quantization of the third data format 212 (FIG. 7B). FIG. 16 shows a detailed version of block 434 of FIG. 12B, quantization of the fourth data format 306 (FIG. 7B). The basic goal of the quantization process is to add filler units or padding to obtain a total data block length which is equal to an integer multiple of the format encoding constant (C). In other words, the raw block length plus filler units equals the total resultant block length, which is an integer multiple of the format encoding constant (C). Filler units are defined as supplemental bits, filler bits, filler bytes, filler words, filler matrices, or the like.

Referring to FIG. 13A and FIG. 13B, the quantization process begins at reference numeral 502, which accepts data from reference block 412 of FIG. 12A. In reference block 504, raw header bits ($H_L$) are placed in a staging area of memory. In block 506, the number of raw header bits ($H_L$) is counted. Next, in block 508, header filler units are added to the header. For example, header filler bits, bytes or words may be added to the header in accordance with $F_H=(2C-1)-((H_L-1) \% 2C)$, wherein $F_H$ is the number of filler units, C is the format encoding constant, % represents the modulo function, and $H_L$ is the number of actual, initial or raw header bits, bytes, or words. The quantity 2C represents the particular case where the head length has a permissible length of 2C.

In block 510, raw file data bits are placed in the staging area adjacent to the header. The raw file data bits preferably immediately follow the header in the staging area of the memory. In block 512, the number of raw file data bits ($D_L$) is determined. At reference number 513 the number of raw file data bits ($D_L$) is compared to zero. If the number of raw file data bits does not equal zero, then the quantization process proceeds to block 514. In block, 514 padding is added to the file data bits. For example, filler units or padding are added in accordance with the formula $F_F=(P-1)-((D_L-1) \% P)$, wherein $F_F$ is the number of padding bits, P is the pitch interval, % represents the modulo function, and $D_L$ is the actual number, initial number or raw number of file data bits, bytes, or words. Note that the evaluation at reference numeral 513 may be deleted, but the efficiency of encoding would be sacrificed where the raw file data has a zero length.

If the number of data bits equals zero at reference numeral 513, then block 514 is skipped and quantization process proceeds with block 516 of FIG. 13B. Reference block 516 of FIG. 13B follows immediately after the execution of block 514. In reference block 516 a tail is created. The tail preferably includes information defining the quantized length of the file data and the quantized length of the header. The raw tail bits are placed adjacent to the file data in staging memory.

In reference block 520, filler units are added to the tail. For example, filler bits are added to the tail according $F_T=(C-1)-((T_L-1) \% C)$, wherein $F_T$ is the number of filler bits, K is the format encoding constant, % represents the modulo function, and $T_L$ is the number of actual, initial or raw number of tail bits, bytes, or words. Filler bits added to the tail preferably proceed the actual tail bits. If, for example, the file data contained padding bits, then the tail filler bits and the padding bits optimally form a continuous region of padding.

Following the above quantization process, the flow chart returns to reference numeral 415 of FIG. 12& so that the data block may be written to a magnetic storage medium 18 (FIG. 1).

FIG. 14 through FIG. 16, inclusive, are derivative of FIG. 13A and FIG. 13B and merely delete or slightly vary certain steps shown in FIG. 13A and 13B. Accordingly, refer the above description of FIG. 13A and FIG. 13B for the meaning of identical reference numerals and corresponding process steps in FIG. 14 through FIG. 16.

FIG. 14 through FIG. 16 have different starting and termination points than FIG. 13A and FIG. 13B do. The quantization process in FIG. 14 starts with block 501 which accepts input from block 416 of FIG. 12A. The quantization process in FIG. 15A and FIG. 15B starts with block 503 which accepts input from block 426 of FIG. 12B. The quantization process of FIG. 16 starts at reference numeral 505 which accepts input from block 432 of FIG. 12B.

When adding padding or filler units to a group of blocks representing a single file, the padding should be kept continuous. For example, if a beginning data block of the group is in the second data format and contains no optional file data, then padding may be added after the head 102 at the end of the beginning data block. If the second block is in the fourth data format, the beginning of the second block may have padding 106. File data 104 would follow any padding 106 in the second block. In this way, the file data 104 is kept spatially continuous within the group of blocks without any intervening padding.

Decoding Four Data Formats

The encoding process described in FIG. 12A and FIG. 12B is used prior to or during the writing of data to a magnetic storage medium. The decoding process that corresponds to the above encoding process is shown as a chart in FIG. 17 and as a flow chart in FIG. 18A and FIG. 18B. The decoding process may be invoked when reading information or retrieving information from the magnetic storage medium.

The decoding process for the four format scheme generally involves calculating the remainder (R) with regards to division of the quantized data block size (Q) by the pitch interval (P). The calculation of such a remainder is expressed as quantized data block size modulo pitch interval, or symbolically as $Q \% P=R$. Throughout the claims and the specification, conventional Euler's division or the modulo function is used to calculate a remainder. That is, the dividend plus the remainder equals the product of the quotient and the divisor.

FIG. 17 illustrates a chart showing the block length decoding equations 86 where four data formats are used. FIG. 17 shows the decoding analog for the encoding of FIG. 7B. The data format identity is decoded by taking $Q \% P=R$, wherein Q is selected, for example, from the group of quantized data block sizes comprising $Q_0$, $Q_1$, $Q_2$, and $Q_3$, P is the pitch interval used in the encoding process, % represents the modulo function, and K is the remainder of conventional Euler's division. If R=3C, then Q is equal to $Q_3$ (i.e. first data format 110). If R=2C, then Q is equal to $Q_2$ (i.e. second data format 210). If R=C, then Q is equal to $Q_1$ (i.e. third data format 212). If R=0, then Q is equal to $Q_0$ (i.e. fourth data format 306).

Figure 18B:
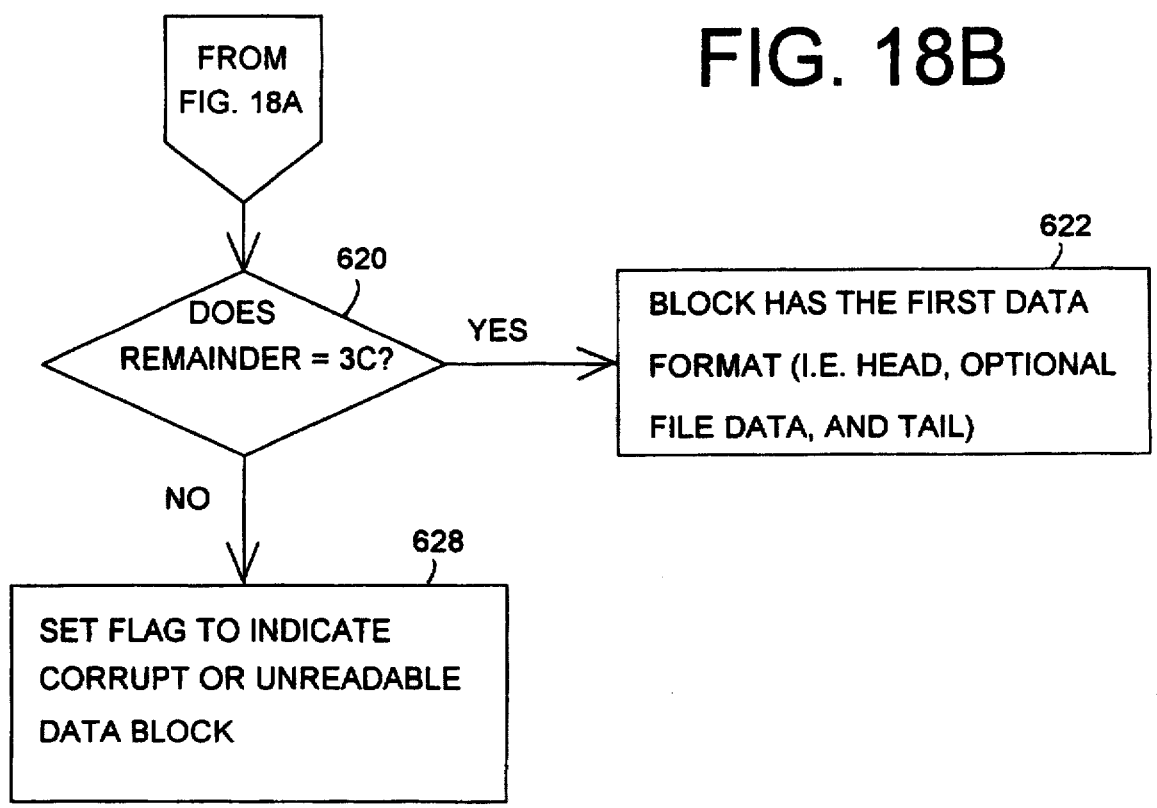

Referring to FIG. 18A and 18B, the decoding process starts at reference numeral 602. At reference numeral 604, a data block is read from a magnetic medium by the magnetic storage device. In block 606, the remainder (R) of the division of the quantized data block size (Q) divided by the pitch interval (P) is calculated. In other words, the result of the quantized data block size modulo the pitch interval is calculated.

According to reference numerals 608 and 610, if the remainder calculated in block 606 is equal to zero, then the data block has the fourth data format 306 (i.e. file data or file contents alone). According to reference numerals 612 and 614, if the remainder is calculated in block 606 is equal to C (format encoding constant), then the data block has the third data format 212 (i.e. file data and a tail).

According to reference numerals 616 and 618, if the remainder calculated in reference block 606 equals 2C (i.e. format encoding constant multiplied by two), then the data block has the second data format 210. According to reference numerals 620 and 622 in FIG. 18B, if the remainder calculated in block 606 equals 3C (i.e. format encoding constant multiplied by three), then the data block has the first data format 110 (i.e. head, optional file data, and tail). In block 628, the computer 22 (FIG. 1) and/or the magnetic storage device 18 (FIG. 1) is instructed to set a flag to indicate a corrupt or unreadable data block if the remainder did not equal either 0, C, 2C, or 3C at reference numerals 608, 612, 610, and 620, respectively. The address or position of corrupt or unreadable block may be stored for future reference. In practice, the digital storage medium may be reread, for example, after rewinding the magnetic storage medium (i.e. tape) slightly to prevent dirt or debris from falsely indicating a corrupt data block.

Figure 19:
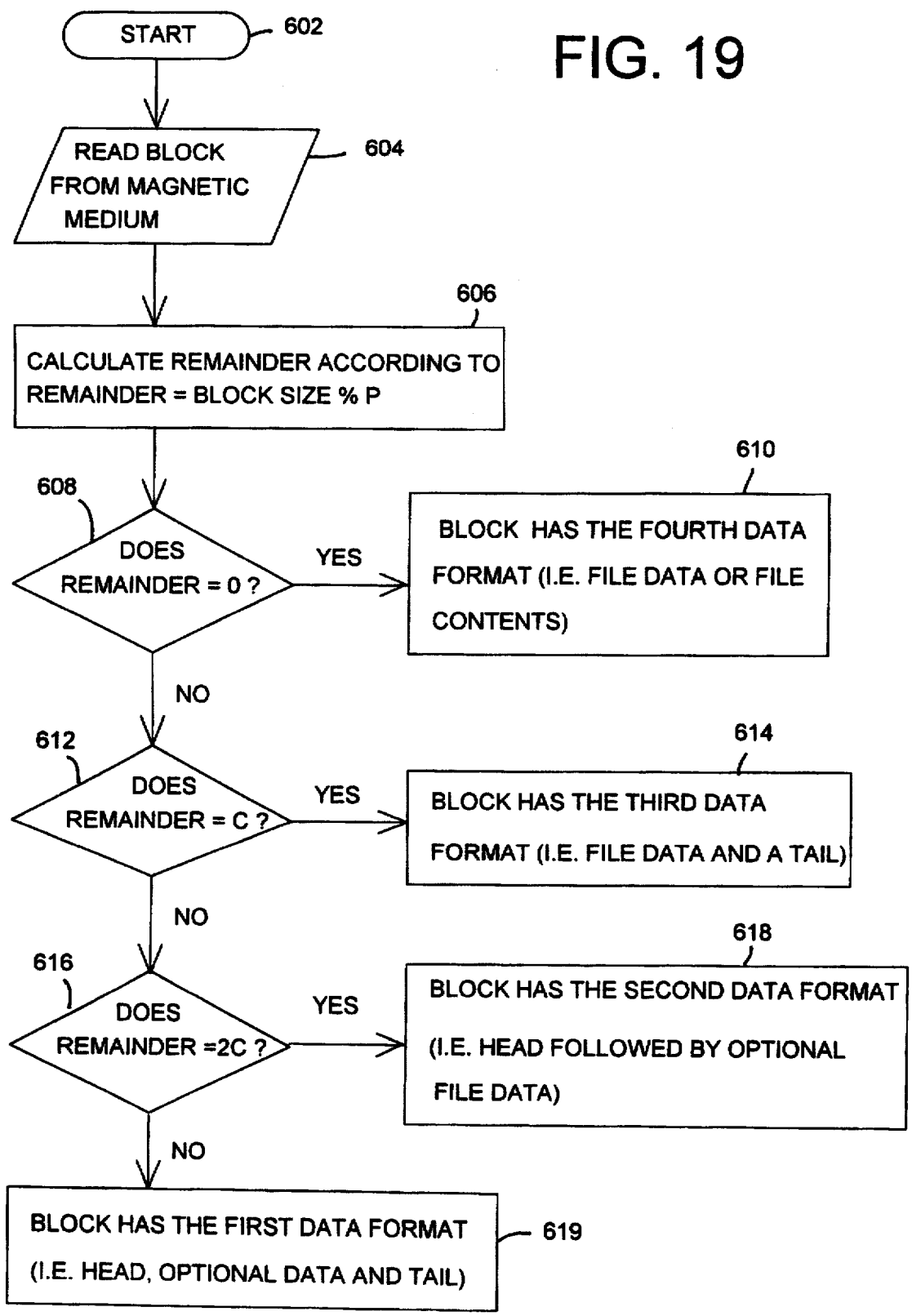
FIG. 19 is a flow chart of a second embodiment of the decoding process for the case where four data formats are used.

A variation of the decoding scheme is illustrated in FIG. 19 in which the step of comparing the remainder to 3C at reference numeral 620 in FIG. 18B has been eliminated. Instead, in reference block 619, the decoding scheme assumes that if the data block size is not one of the three previous sizes (i.e. 0,C, or 2C), the data block size must coincide with the last size (i.e. 3C). The assumption of FIG. 19 is only correct if the data block size is not corrupt.

Recovery of a Defective or Missing File Directory

The method for data recovery of a defective or missing file directory uses the foregoing method of storage and retrieval in conjunction with additional software instructions, which create a file directory to index files stored on the magnetic storage medium 18 (FIG. 1). The additional software instructions, such as those instructions found in a backup application program, preferably cause files to be indexed by sessions. A session is a period of time during which data is written to and not merely read from the digital magnetic storage medium. At the end of the user session at the computer 22, catalog data or a file directory is be created and stored as a special file called a catalog file. The catalog file has catalog data for indexing and referencing the entire recorded contents of the magnetic storage medium at the time of the catalog recording. The catalog file stores descriptive data of each file such as file name, creation date, and file size. The catalog file also may contain the position or the block address of the file data of a particular file.

If the catalog file is placed on magnetic tape, the catalog file is preferably preceded by a setmark and followed by a filemark to distinguish the catalog file from other files, but numerous other techniques exist for flagging or indexing the catalog file. The filemark and the setmark permit searching of the magnetic storage medium. The catalog file optimally includes referencing information indicating the address or position of each prior catalog. The catalog file never contains referencing data for any blocks which are not already written on the magnetic storage medium.

The catalog file can be corrupted by stray magnetic fields, by physical abrasion of the magnetic storage medium, heat, severing a magnetic tape, hard disk read errors, and the like. A catalog file may not even be present because the computer crashes or because of power failures which power down the computer before the catalog file is stored. Therefore, the magnetic storage medium may contain unreferenced information through no fault of the magnetic storage medium. If the method of data storage and retrieval of the present invention is used, then a catalog file may be reconstructed from the files recorded on the magnetic storage medium. In other words, if the magnetic storage device cannot read a section of the magnetic storage medium containing the catalog file, but can still read other sections of the magnetic storage medium containing files, then part or all of the catalog data can be reconstructed. Consequently, individual files can be accessed notwithstanding damage to the file directory or catalog file.

In accordance, with the Method of Storage and Retrieval Using Four Data Formats, the head and the tail of the plurality of data formats are designed to contain sufficient information to read and recover an entire associated file. As well as recording the head and tail associated with a given file, directory operations are also optimally recorded in the first data format with zero length file data. Directory operations include creating, deleting subdirectories, renaming, and deleting files. Special data in the head and the tail may indicate that the record is a non-file record containing directory operation information. File deletion need not erase the blocks eliminated by a deleted file, especially when the magnetic storage medium is digital audio tape (DAT) or digital data storage (DDS). The directory operation information in conjunction with head and tail information is used to reconstruct damaged or unreadable catalog information.

Figure 20:
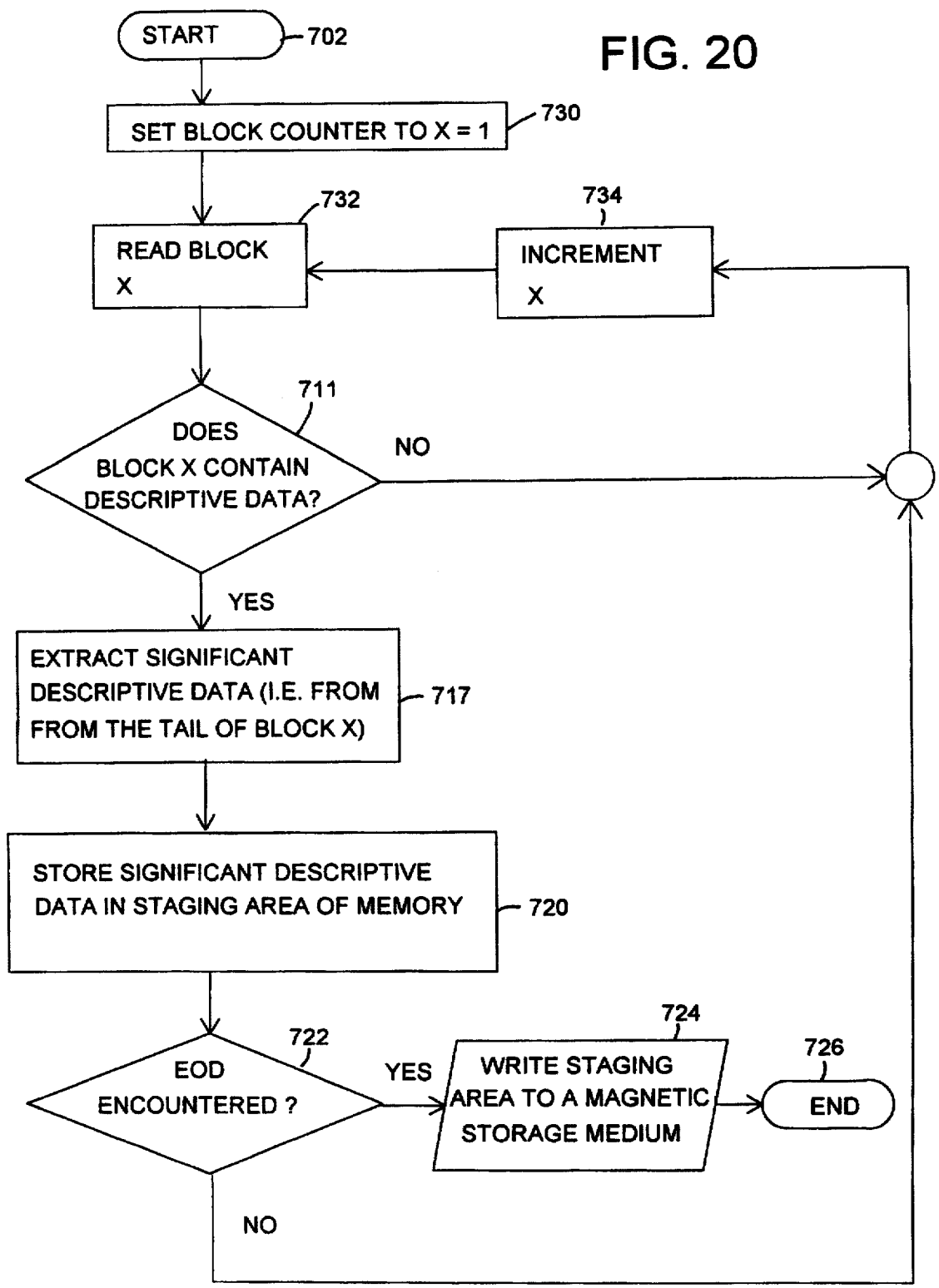
FIG. 20 is a flow chart illustrating a first embodiment of the process for reconstructing a directory from variable length encoded blocks when an original directory on a magnetic medium is corrupted or missing.

FIG. 20 illustrates a data recovery process for a damaged or destroyed file directory on a magnetic storage medium (i.e. magnetic storage medium 18 in FIG. 1). In a preferred embodiment, the respective file directory (or catalog file) and the corresponding files are stored on the same magnetic storage medium. Hence, the magnetic storage medium may be readily transferable to computers. However, in alternative embodiments, note that the file directory may be stored on a separate magnetic storage medium. That is, while the file directory is stored on a hard disk, the actual files are stored on a magnetic tape. In either file directory storage configuration, data recovery pursuant to FIG. 20 is often possible.

Prior to beginning the data recovery process of FIG. 20, the magnetic storage medium 18 (FIG. 1) contains files recorded pursuant to the data storage and retrieval method of the present invention. The magnetic storage medium 18 is associated with the appropriate magnetic storage device 16 (FIG. 1.) The catalog file or directory for the files on the magnetic storage medium is unreadable in whole, in part, or is missing. In response to a request to reconstruct a file directory or after one or more failed attempts to read the latest file directory, the data recovery process begins at reference numeral 702.

After beginning at start 702, the block counter is set equal to X equals one in block 730. The first data block does not necessarily equal the first data block on the magnetic storage medium (i.e. magnetic tape). Rather, the first data block typically represents the first data block after the last readable catalog file. In other words, the last file catalog is the starting point for reading data blocks in the directory recovery process. In reference block 732, data block X (i.e. block one) is read from the magnetic storage medium.

At reference numeral 711, a processor (i.e. 20 in FIG. 1) determines whether descriptive data (i.e. tail) are present in data block X by evaluating the data block length. If, for example, the data block X is in the first data format or in the third data format, then the data block X contains descriptive data in the form of a tail, and the recovery process proceeds to reference block 717. If the data block X does not contain descriptive data, then X is incremented in reference block 734 so that the next block will be read in reference block 732. Determining whether descriptive data (i.e. a head 102, a tail 108, or descriptive data 802 (FIG. 2A)) are present is determined by executing a block length decoding scheme which corresponds to the appropriate block length encoding scheme. The block length decoding schemes may utilize the block length decoding equations illustrated in FIG. 3B, FIG. 4B, or FIG. 17.

For illustrative purposes, consider the block length decoding equations 86 of FIG. 17 in conjunction with FIG. 20. If the block size of the data block read in block X is divided by the pitch interval (P), which is an integer multiple of the format encoding constant (C), then the remainder indicates the presence or the absence of a head or a tail in data block X. Specifically in accordance with FIG. 17, if Q % P=3C or if Q % P=C (wherein Q is the block size of block X, P is the pitch interval, and C is the format encoding constant, and % represents a modulo function), then the data block contains a tail. In other words, the data block is in the first data format 110 or the third data format 212.

If descriptive data (i.e. a tail) are encountered in data block X at reference numeral 711, then in reference block 717 significant descriptive data regarding file properties is extracted from block X or the tail of block X. Significant descriptive data may include, for example, the file name, position of the file in the physical data, file length, file creation date, or the like. Following block 717, in block 720 the significant descriptive data of block X is stored in a staging area of the memory. The significant descriptive data are optimally stored in a format suitable for directory records or directory entries.

If descriptive data (i.e. a tail) are not encountered in block X at reference numeral 711, then the block counter is incremented in block 734. In other words, X is increased by one. Next, the data block X is read again in reference block 732. The loop through reference numerals 711, 734, and 732 continue until a descriptive data (i.e. a tail) are encountered, after which data flow proceeds to reference block 717.

Continuing from block 720, at reference numeral 722, the processor determines whether an end-of-data (EOD) mark was encountered. The magnetic storage device typically provides an end-of-data mark. Alternatively, a series of setmarks can be used to indicate the end of data. If the end-of-data mark was not encountered, then the directory recovery process continues starting at reference block 732. On the other hand, if the end-of-data mark was encountered, then the contents of the staging area are written to the magnetic storage medium in reference block 724. The new catalog file also may incorporate directory operations (not shown) prior to writing the staging area to a magnetic storage medium at reference numeral 724.

The recovery process terminates at end 726. A new catalog file should now be present on same magnetic storage medium as the corresponding files are stored or on a different magnetic storage medium than the corresponding files are stored. The new catalog file enables a user to efficiently retrieve files that were formerly inaccessible. Note that the file directory may be reconstructed in a single-pass reading of the magnetic storage medium recorded with encoded block sizes pursuant to the present invention. Reconstruction of the file directory without changing the direction of the tape on a single pass often increases the retrieval speed of data stored on the tape.

Figure 21A:
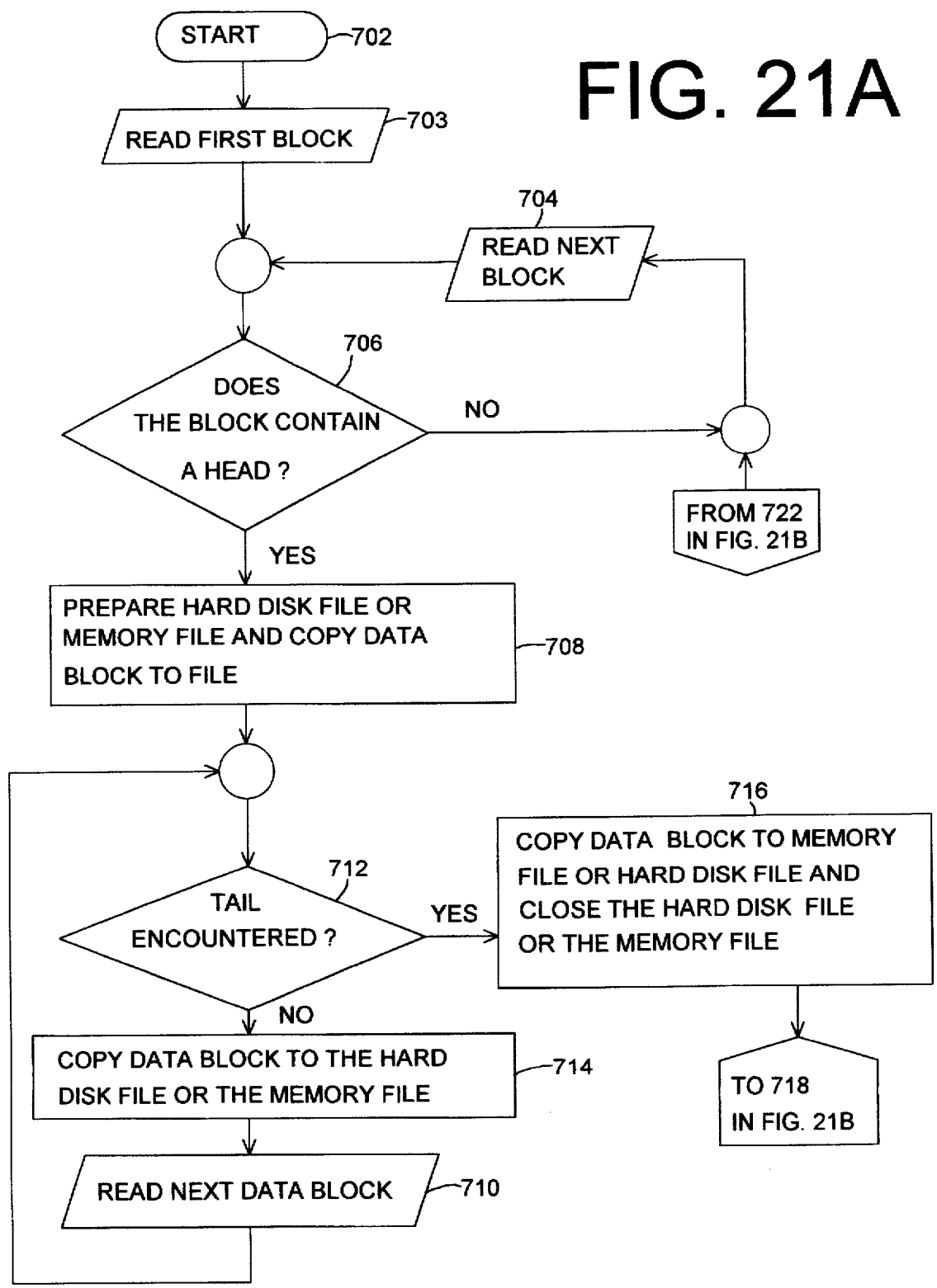
FIG. 21A and FIG. 21B is a flow chart illustrating a second embodiment of the process for reconstructing a directory which places the newly reconstructed directory in memory or on a hard disk for anticipated future referencing.
Figure 21B:
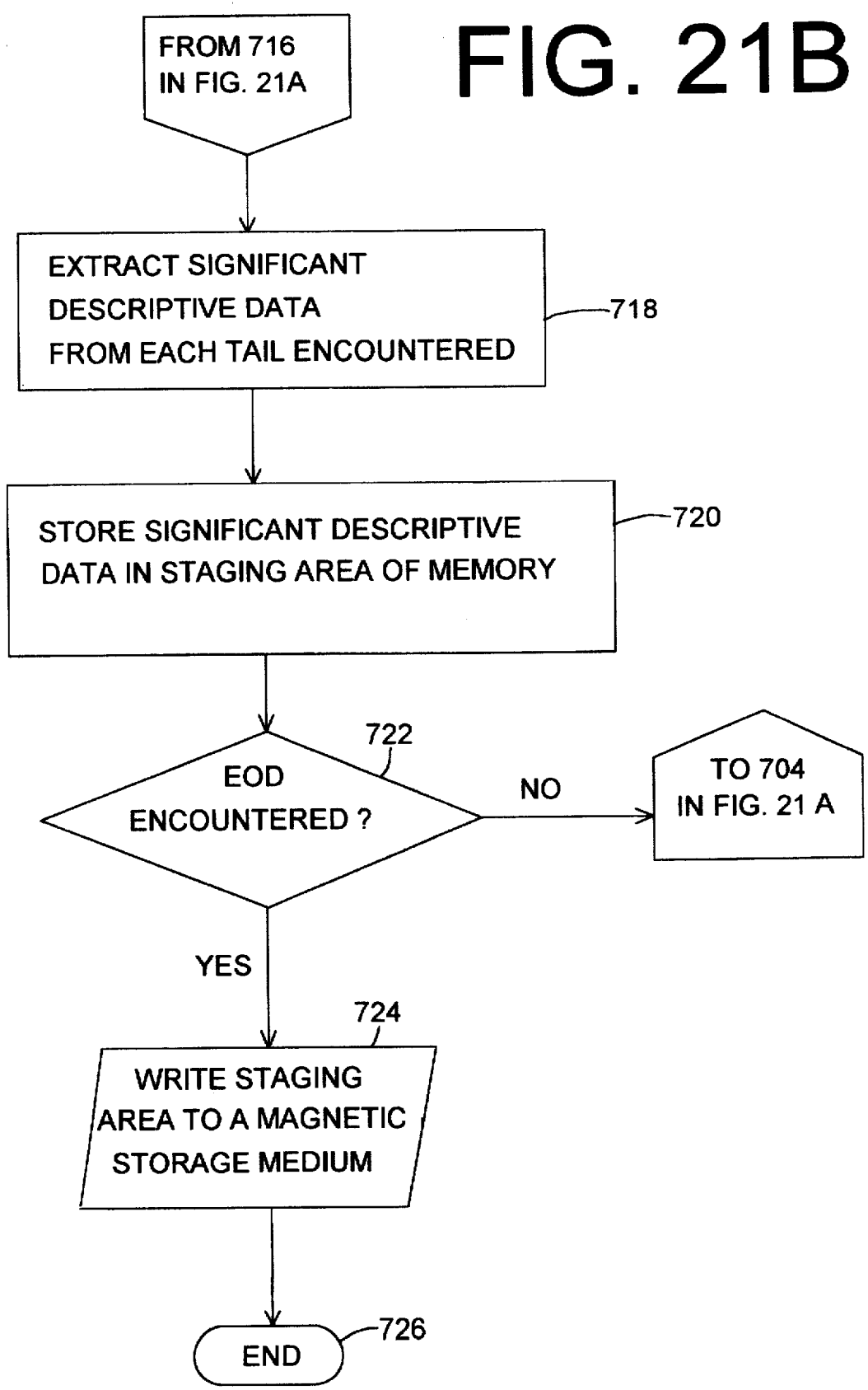

FIG. 21A and 21B illustrate an alternate embodiment of the recovery process, wherein the recovery process anticipates future reading of files from a hard drive or memory of a computer. The recovery process of FIG. 21A and 21B is described with reference to the four structure data format or any another data format that uses a head, file data, and a tail as data elements of data blocks.

In response to a request to reconstruct a catalog file or file directory, the data recovery process begins at reference numeral 702. Typically, the data recovery process is initiated after one or more failed attempts to read the file directory. At reference numeral 703, the first data block is read. The first data block is the first data block following the last previous directory, which is readable and sound. However, if there is not a previous directory, then the first data block is, for example, the first physical data block extracted from the first frame recorded on the magnetic tape.

In the configuration of FIG. 21A and FIG. 21B, a section of the tape preferably starting after the last readable catalog file or directory is continuously read once. In reading the first data block at reference numeral 703, the block length is determined. At reference numeral 706, the data block length is evaluated to determined whether the data block contains a head. If the data block contains a head, the data block is copied or placed in a hard disk file or a memory file in reference block 708. If the data block does not contain a head, then the next data block is read at reference numeral 704. The recovery process then continues with reference numeral 706.

After reference block 708 is executed, the processor determines whether or not the data block has a tail at reference number 712. If the data block contains a tail, then the hard disk file or the memory file is closed in block 716 after the data block containing tail is copied to the memory file or the hard disk file.

If the data block does not contain a tail, then the data block is copied to the hard disk file or to the memory file in reference block 714. The data block being copied contains file data only (i.e. fourth data format). In block 710, the next data block is read. The recovery process, next returns to reference numeral 712 where the processor determines if a tail is present in the next data block. If a tail is present in the next data block, the hard disk file or memory file is closed in reference block 716 after the data block containing the tail is copied to the memory file or the hard disk file. If a tail is not present in the next data block, the recovery process loops through reference blocks 712, 714, and 710 again.

Following reference block 716, the recovery process resumes with reference block 718 in FIG. 21B. Significant descriptive data from each tail encountered is extracted. The significant descriptive data are stored in the staging area of memory in reference block 720.

At reference numeral 722, the processor determines whether the end-of-data (EOD) has been encountered. The end-of-data is indicated by a marker recognized and/or defined by the magnetic storage device. Alternatively, the end-of-data may be indicated by a series of setmarks, filemarks, or any combination of individual setmarks and filemarks. If the end-of-data is not encountered, then the process continues with reference numeral 704 in FIG. 21A. If the end-of-data is encountered, then the staging area is written to the magnetic storage medium at reference block 724. The staging area contains the newly developed catalog file or file directory. Optionally, the staging area may be written to the hard disk or memory to facilitate quick retrieval where the magnetic storage medium is magnetic tape.

The foregoing detailed description is provided in sufficient detail to enable one of ordinary skill in the art to make and use the method for data storage and retrieval, and the related method for data recovery from a magnetic storage medium. The foregoing detailed description is merely illustrative of several methods and the associated physical structures for practicing the present invention. Variations of the methods of the present invention, not fully described in the specification, are encompassed within the purview of the claims. Accordingly, the description of the elements in the specification should be used for general guidance and particularly to assist in evaluating equivalency of claim elements under the doctrine of equivalents. The narrow description of elements in the specification should not be used to unduly restrict broader descriptions of the elements in the following claims.

I claim:

1. A method of operating a computer for the storage of files on a magnetic storage medium, the method comprising the steps of:

a) inputting files into the computer, each of said files having file data;

b) organizing each file of said files into at least one logical data block having a block size, the file data for each file being logically stored in a spatially continuous manner without any intervening padding segmenting the file data;

c) encoding file boundary information as the block size of one data block or differential block sizes of multiple data blocks per file in conformance with predetermined categories of block sizes, a first one of said predetermined categories indicative of file boundaries; and d) providing said files to a magnetic storage device for recording on the magnetic storage medium, said encoding being substantially independent of any type of modulation the magnetic storage device uses for recording.

2. The method of claim 1 wherein step b of organizing is accomplished by organizing a particular one of said files into multiple logical data blocks so that file data for said particular one contiguously spans adjacent logical data blocks.

3. The method according to claim 1 wherein step d of providing said files is accomplished by adjacently arranging said files in logical data blocks for recording on the magnetic storage medium without placing a setmark between adjacent data blocks of different files.

4. The method according to claim 1 further comprising the step of:

e) arranging said logical data blocks into at least one physical frame and recording said physical frame on the magnetic storage medium.

5. The method according to claim 1 further comprising the step of:

e) arranging said logical data blocks into frames;

f) interleaving bits comprising said frames prior to recording said frames on the magnetic storage medium; and g) recording said frames on the magnetic storage medium.

6. The method according to claim 1 further comprising:

e) recording said logical data blocks on the magnetic storage medium by electromagnetically orienting magnetizable particles of a magnetic tape, said magnetic storage medium comprising said magnetic tape;

f) reading the magnetic tape recorded;

g) retrieving a selected file from the magnetic tape by decoding at least one block size to determine the file boundaries of the selected file stored on the magnetic tape.

7. The method according to claim 1 further comprising the step of:

e) annotating said file data with descriptive data describing file characteristics of each file such that one data block for each file contains said descriptive data, said descriptive data including file characteristics such as file name and file size.

8. The method according to claim 7 further comprising the step of:

f) recording said logical data blocks on the magnetic storage medium by electromagnetically orienting magnetizable particles of a magnetic tape, said magnetic storage medium comprising said magnetic tape; and g) constructing a file directory of said files by referencing said descriptive data for said files.

9. The method according to claim 1 wherein, during the step of encoding file boundary information as the block size, a second one of said predetermined categories is indicative of a file boundary.

10. A method of operating a computer to store a first file and a second file, the method comprising the steps of:

a) inputting a first file into a computer, the first file having file data;

b) organizing the first file into at least one logical data block with the entire file data of the first file stored continuously and uninterrupted by referencing information, the first file's file data potentially occupying at least one complete logical data block if the first file occupies more than one logical data block; the first file having first file boundaries indicated by a block size of one data block or differential block sizes of multiple data blocks that contain the first file;

c) providing said first file to a magnetic storage device for recording said first file on the magnetic storage medium;

d) inputting a second file into the computer, the second file having file data;

e) organizing the second file into at least one data logical block with the entire file data of the second file stored continuously and uninterrupted by referencing information, the second file having second file boundaries indicated by a block size of one data block or differential block sizes of multiple data blocks that contain the second file;

f) providing said second file to the magnetic storage device for recording said second file on the magnetic storage medium such that the second file is stored adjacently to said first file without any intervening filemark.

11. The method according to claim 10 wherein step e of organizing is accomplished by organizing the second file into a second group of logical data blocks, the second group having second file boundaries defined by two logical data blocks of said second group; and wherein step f of providing the second file for recording is accomplished by recording said second group on a magnetic storage medium such that the file data for the second file is stored in a spatially continuous manner and contiguously spans adjacent logical data blocks within the second group of blocks without any intervening referencing information.

12. The method according to claim 10 wherein step b of organizing is accomplished by organizing the first file into a single data block, the first file contained in one logical data block, the first file having file boundaries defined by said single logical data block; and wherein step c providing the first file for recording is accomplished by providing said single data block for recording on a magnetic storage medium such that the file data for the first file is stored in a spatially continuous manner without any intervening referencing information.

13. The method according to claim 10 wherein step e of organizing is accomplished by organizing the second file into a single data block, the second file contained in one logical data block, the second file having file boundaries defined by said single logical data block; and wherein step f of providing the second file for recording is accomplished by providing said single data block for recording on a magnetic storage medium such that the file data for the second file is stored in a spatially continuous manner without any intervening referencing information.

14. A method of operating a computer for file storage on a magnetic storage medium, the method comprising the steps of:

a) defining a maximum allowable data block size of a data block to be stored on the magnetic storage medium;

b) inputting a file into a memory of the computer, said file comprising file data having file characteristics;

c) assigning one data format of a plurality of data formats to the data block depending upon said file characteristics, said data formats establishing intrablock data organization, one of said data formats containing only file data; and d) encoding information on the intrablock data organization as a block size of the data block in conformance with predetermined categories of block sizes, said block size representing one of said data formats assigned and said block size being indicative of the intrablock data organization, said encoding being substantially independent of any modulation scheme associated with a magnetic storage device.

15. The method according to claim 14 wherein step c of assigning is accomplished by assigning the data format which represents the entire file in one corresponding data block if a file size of said file is less than or equal to the maximum allowable data block size, the data format establishing file boundaries of the file, the file boundaries defined by a beginning and an end of the data block.

16. The method according to claim 14 wherein step c of assigning is accomplished by assigning the data format which represents a portion of the file by one corresponding data block, the data format establishing one file boundary of the file, the file boundary defined by a beginning of the data block.

17. The method according to claim 14 wherein step c of assigning one of the data formats to the data block is accomplished by assigning the data format which represents a portion of the file by one corresponding data block, the data format establishing one file boundary of the file, the file boundary defined by an end of the data block.

18. The method according to claim 14 wherein inputting a file into the memory of the computer is accomplished by inputting a file only having file data into the memory of the computer, and further comprising the step of:

e) annotating the file with descriptive data after the file solely containing file data is inputted into the memory of the computer, one of said data formats containing descriptive data.

19. The method according to claim 18 wherein step e of annotating is accomplished by annotating the file data with descriptive data wherein said descriptive data comprises file characteristics selected from the group consisting of file name data, file length data, author identification data, and file creation date data.

20. The method according to claim 18 further comprising the steps of:

f) decoding the block size of the data block to determine whether or not the data block contains descriptive data; and g) selecting an appropriate file for retrieval after inspecting any descriptive data which was located by decoding the block size in step f.

21. The method according to claim 18 further comprising the steps of:

f) decoding the block size of the data block to determine whether or not the data block contains descriptive data; and g) extracting relevant descriptive data from any data block containing descriptive data to construct a new file directory if a previous file directory is defective or missing.

22. The method of operating a computer according to claim 14 and wherein step a of defining a maximum allowable block size is determined based on a buffer memory size of a magnetic storage device coupled to said computer; and wherein step c of assigning one of plurality of data formats is accomplished by selecting a data format based upon the file characteristic of file size.

23. The method according to claim 14 wherein step a of defining the maximum allowable block size includes decreasing the maximum allowable block size by an allowance for overhead units to yield a threshold size, said overhead units used for adjusting the block size to conform to a distinctive specified size, and wherein step c of assigning one of a plurality of data formats depends upon a comparison of the file size to the threshold size.

24. The method of operating a computer according to claim 14 wherein step c of assigning one of the plurality of data formats is accomplished by associating a primary data format with a portion of the file supplemented with any descriptive data, the descriptive data describing the file characteristics of the file; and wherein step d of encoding yields a primary distinctive block size representing the primary data format, the primary distinctive block size being distinguishable from a secondary distinctive block size.

25. The method of operating a computer according to claim 24 wherein step d of encoding information as a block size is accomplished by adjusting the primary distinctive block size of any data block assigned to the primary data format to have an even length of storage units, the even length being equal to a raw block length if said raw block length modulo two equals zero, and if said raw block length modulo two does not equal zero, then the even length being equal to the raw block length plus one filler unit.

26. The method of operating a computer according to claim 24 wherein the primary distinctive block size comprises an odd length of storage units and the secondary distinctive block size comprises an even length of storage units.

27. The method of operating a computer according to claim 14 wherein step c of assigning one of the plurality of data formats is accomplished by associating a secondary data format with a portion of the file containing entirely file data; and wherein step d of encoding yields a secondary distinctive block size representing the secondary data format, the secondary distinctive block size being distinguishable from a primary distinctive block size.

28. The method of operating a computer according to claim 27 wherein step d of encoding is accomplished by adjusting the secondary distinctive block size of any data block assigned to the secondary format to have an odd length of storage units; the odd length being equal to a raw block length if said raw block length modulo two does not equal zero, and if said raw block length modulo two equals zero then the odd length being equal to the raw block length plus one filler unit.

29. The method of operating a computer according to claim 27 with the primary distinctive block size comprises an even length of storage units and the second distinctive block size comprises an odd length of storage units.

30. The method of operating a computer according to claim 14 wherein step d of encoding information as a block size further comprises the steps of:

i) providing an encoding constant to the computer; and ii) quantizing the block size of one of the data formats into a quantized size which is an integer multiple of the encoding constant such that said quantized size is distinguishable from another one of the data formats having a nonquantized size representing another one of the data formats, said predetermined categories including said quantized size and said nonquantized size.

31. The method of operating a computer according to claim 30 wherein quantizing is accomplished by adding padding to a raw block size of the data block, the padding selected from the group consisting of a filler unit, a filler bit, a filler byte, a filler word, and a filler array.

32. The method of operating a computer according to claim 30 wherein quantizing is accomplished by adding padding of a uniform pattern to a raw block size of the data block to maximize data compression in accordance with a conventional data compression algorithm.

33. The method according to claim 14 wherein step c of assigning is accomplished by assigning a primary format of said formats to the data block; and step d of encoding further comprises associating the primary data format with a block length encoding equation wherein a quantized block ($Q_C$) length equals any nonnegative integer (n) multiplied by an encoding constant (K) such that the primary data format is distinguishable from a secondary data format of said formats.

34. The method according to claim 14 wherein step c of assigning is accomplished by assigning a secondary data format of said formats to the data block; and step d of encoding further comprises associating the secondary data format with a block length encoding equation wherein a nonquantized block length ($Q_D$) equals the sum of a product of any nonnegative integer (n) multiplied by an encoding constant (K) added to a quantization offset (Z) such that the secondary format is distinguishable from a primary data format of said formats.

35. A method of operating a computer for file storage on a magnetic storage medium, the method comprising the steps of:
   a) defining a maximum allowable data block size of each data block to be recorded on the magnetic storage medium;
   b) inputting a file into a memory of the computer, said file having a file size;
   c) comparing the file size to the maximum allowable data block size and placing the file into a group of data blocks for file storage on the magnetic storage medium if a file size exceeds the maximum allowable data block size;
   d) encoding interblock indexing information as the block sizes of the group, the block sizes conforming to categories of block sizes calculated pursuant to a mathematical block length encoding equation using a modulus or modulo function, each block size representing the relative locations or relative order of one corresponding data block within the group, relative locations including a first data block and a last data block within the group.

36. The method according to claim 35 wherein the file has file data which is located continuously within the group of data blocks, said file data contiguously spanning adjacent data blocks within the group.

37. The method according to claim 35 wherein step c of comparing the file size further comprises dividing the file into file portions for placement into the group of data blocks, the file portions including a beginning portion, an intermediate portion, an end portion; and the method further comprising the step of:
   e) decoding information from the block size of any data block selected from the group of data blocks to determine whether or not the data block contains the intermediate portion of the file.

38. The method according to claim 35 wherein the step d of encoding information into the block sizes of a group includes establishing the categories of distinct block sizes including a beginning block size and a last block size, the beginning block size representing a beginning data block of the group, the beginning data block containing a beginning portion of the file; and the last block size representing the last data block of the group, the last data block containing an end portion of the file.

39. The method according to claim 38 further comprising the step of establishing an intermediate block size as one of the categories of distinct block sizes, said intermediate block size representing an immediate data block of the group, an intermediate data block interveningly located between the beginning data block and the last data block, the intermediate data block containing an intermediate portion of the file.

40. The method according to claim 39 further comprising the step of:
   e) decoding information from the block size of any data block selected from the group of data blocks to determine whether or not the data block contains the intermediate portion of the file.

41. The method according to claim 38 further comprising the step of:
   e) decoding information from the block size of any data block selected from the group of data blocks to determine whether or not the data block contains the beginning portion of the file.

42. The method according to claim 38 further comprising the step of:
   e) decoding information from the block size of any data block selected from the group of data blocks to determine whether or not the data block contains the end portion of the file.

43. The method of operating a computer according to claim 35 further comprising the step of:
   e) assigning one of a plurality of data formats to each of said data blocks of the group based on the comparison of step c; the data formats defining block composition of the data blocks of the group; and the data formats comprising a beginning data format, an end data format, and an intermediate data format; and wherein the beginning data format has a head containing descriptive data, the end data format has a tail containing descriptive data, and the intermediate data format has file data, said descriptive data defining file characteristics of the file.

44. The method of operating a computer according to claim 43 wherein the file characteristics include the file size, a file creation date, and a file name of said file.

45. The method of operating a computer according to claim 43 wherein the beginning data format and end data format each optionally contain file data.

46. The method of operating a computer according to claim 43 wherein the beginning data format comprises a data block beginning with the head.

47. The method of operating a computer according to claim 43 wherein the end data format comprises a data block ending with the tail.

48. The method of operating a computer according to claim 43 wherein encoding the block sizes in step d comprises quantizing the beginning data format to have a beginning quantized block length, quantizing the intermediate data format to have an intermediate quantized block length, and quantizing the end data format to have an end quantized length, wherein the beginning, intermediate and end quantized lengths each are an integer multiple of a format encoding constant (C), and wherein the beginning, intermediate and end quantized lengths are distinguishable from each other.

49. The method of operating a computer according to claim 48 wherein the beginning quantized length is equal to 2C+mP, the intermediate quantized length is equal to mP, the end quantized length is equal to C+mP, wherein C is the format encoding constant representing the granularity of final, resultant block size, P is a pitch interval in storage units, m is a nonnegative integer, and P/C is greater than two.

50. The method of operating a computer according to claim 49 further comprising the step of:

f) decoding any block length to determine its corresponding data format by calculating quantized block length modulo the pitch interval to yield a remainder, wherein the remainder of 2C signifies the beginning data format, the remainder of zero signifies the intermediate data format, and the remainder of C signifies the end data format.

51. A method of operating a computer for file storage, the method comprising the steps of:

a) defining a maximum allowable data block size of each data block for file storage;

b) inputting a file comprising file data into the computer, the file having a file size;

c) comparing the file size to the maximum allowable data block size;

d) placing the file into a minimum of one data block;

e) assigning a particular data format to any data block in which the file is placed depending upon the comparison so that the entire file data of the file is continuously positioned within any data block, the file data uninterrupted by referencing information; and f) encoding data format information as a distinct block size for each data block, the distinct block size representing the particular data format assigned without reference to any format change marks.

52. The method of operating a computer for file storage according to claim 51 wherein encoding information as a distinct block size for each data block comprises encoding each data block to have a corresponding quantized block length, the corresponding quantized block length selected from a set of quantized lengths, which are integral multiples of a format encoding constant.

53. The method of operating a computer for file storage according to claim 52 wherein the quantized block length of each data block is equal to a raw block length of the data block plus a minimum number of filler units necessary to equal the quantized block length.

54. The method of operating a computer for file storage according to claim 51 wherein step f of encoding information as a distinct block size for any data block comprises encoding a data block assigned to a first data format to have a corresponding first quantized block length determined by the equation of $Q_3=3C+mP$, encoding a data block assigned to a second format to have a corresponding second quantized block length determined by the equation of $Q_2=2C+mP$, encoding a data block assigned to a third format to have a corresponding third quantized block length determined by the equation of $Q_1=C+mP$, and encoding a data block assigned to a fourth format to have a corresponding fourth quantized block length determined by the equation of $Q_0=mP$, wherein C is a format encoding constant, m is any nonnegative integer, P is a pitch interval, $Q_3$ is the first quantized block length, $Q_2$ is the second quantized block length, $Q_1$ is the third quantized block length, and $Q_0$ is the fourth quantized block length.

55. The method of operating a computer for file storage according to claim 51 wherein the step e of encoding information as the block size is accomplished by adding filler units or padding to file data in any data block containing file data in accordance with $F_F=(P-1)-((D_L-1) \% P)$, wherein $F_F$ is the number of filler units to be added, P is a data pitch interval, $D_L$ is the number of raw file data bits, bytes, or words, and % represents the modulo function.

56. The method of operating a computer for file storage according to claim 51 wherein the step f of encoding information as the block size is accomplished by adding filler units to any data block containing a head in accordance with $F_H=(2C-1)-((H_L-1) \% 2C)$, wherein $F_H$ is the number of head filler units, C is the format encoding constant, H, is the number of raw header bits, bytes, or words, and % represents the modulo function.

57. The method of operating a computer for file storage according to claim 51 wherein the step f of encoding information as the block size is accomplished by adding filler units to any data block containing a tail in accordance with $F_T=(C-1)-((T_L-1)\% C)$, wherein $F_T$ is the number of filler bits, C is the format encoding constant, $T_L$ is the number of raw tail bits, bytes, or words, and % represents the modulo function.

58. The method of operating a computer according to claim 51 further comprising the step of:

g) writing the data block of the file to a magnetic storage medium after assigning the format in step d and encoding the block length in step e.

59. The method according to claim 51 further comprising the steps of:

g) repeating the steps a through e, inclusive, for a plurality of files to yield a plurality of encoded data blocks; and h) recording the encoded data blocks on a magnetic storage medium, including a recorded segment of contiguous file data for each file stored on a magnetic storage medium, the file data being uninterrupted by any intervening padding or filler units.

60. A method for recovering data from a magnetic storage medium with a corrupt file directory, a defective file directory, or a magnetic storage medium missing a file directory, the method comprising the steps of:

a) writing files to the magnetic storage medium in a data format, wherein the data block composition is defined by encoded block lengths, and wherein the data block either contains descriptive data alone, file data alone, or both file data and descriptive data;

b) reading at least one data block from the files written to the magnetic storage medium;

c) identifying any data blocks read that contain descriptive data by evaluating encoded block length;

d) extracting significant descriptive data from at least one data block identified as containing descriptive data; and e) storing the significant descriptive data in a staging area of memory.

61. The method for recovering the data according to claim 60 comprising the step of:

f) writing the significant descriptive data from the staging area to the magnetic storage medium as a file directory.

62. The method for recovering data according to claim 60 further comprising the steps of:

f) ignoring a data block when said data block solely contains file data, as opposed to descriptive data.'

63. The method for recovering data according to claim 60 further comprising the steps of f) evaluating block length to determine if the encoded block length is a valid quantized value; and g) generating a flag or response to indicate that a data block not having said valid quantized value is corrupt.

64. The method for recovering data according to claim 60 further comprising the steps of:

f) writing blocks containing file data to memory of a computer; and g) indexing the blocks stored in the memory of the computer to facilitate subsequent retrieval.

65. The method for recovering data according to claim 60 further comprising the steps of:

f) writing blocks containing file data to a hard disk of a computer; and g) indexing the blocks stored on the hard disk of the computer to facilitate subsequent retrieval or contains a file data plus a tail (i.e. third data format).

66. The method for recovering data according to claim 60 further comprising the steps of:

f) comparing the values of descriptive data located in a head and a tail of a group of blocks or a single block representing a file; and g) discarding values of the descriptive data which are not the same.

67. The method for recovering data according to claim 60 further comprising the steps of:

f) comparing the values of descriptive data located in a head and a tail of a group of blocks or a single block representing a file; and g) replacing the values of descriptive data with tail values which conflict with head values.

68. A system for formatting logical data blocks to be recorded on a magnetic storage medium, the system comprising:

a database having rules defining data composition of data blocks and the database having encoding equations defining encoded data block sizes that represent particular data compositions and file boundaries;

a computer equipped with a magnetic storage device, said magnetic storage device accepting the magnetic storage medium, said computer accepting an input of files created by a user, said files having file data, said files associated with descriptive data, said descriptive data defining file properties of corresponding files; and a processor within said computer to place the files received in the data blocks according to said rules and to adjust the data block size of the data blocks according to said encoding equations such that files are subsequently retrieved by referencing said particular data compositions and file boundaries.

69. The system according to claim 68 wherein the magnetic storage device comprises a device selected from the group of storage devices consisting of a digital data storage (DDS) drive, a quarter inch cartridge (QIC) drive, a digital tape drive, an analog tape drive, a Winchester drive, a disk drive, a floppy disk drive, a hard disk drive, and a drum.

70. The system according to claim 68 wherein the magnetic storage medium comprises a magnetic tape selected from the group consisting of digital data storage (DDS) tape, DDS-DC tape, DDS-2 tape, DDS-3 tape, DDS-4 tape, quarter inch cartridge tape (QIC), quarter inch wide tape, digital audio tape (DAT), and digital linear tape (DLT).

71. The system according to claim 68 wherein the rules define four types of data blocks, a first data format having a head, optional file data, and a tail, the second data format having a head and optional data, the third data format having optional data and a tail, and the fourth data format having file data, wherein the head and tail comprise descriptive data.

72. The system according to claim 71 wherein the tail contains descriptive data including a file size, a file name, and a file creation date describing a corresponding one of said files.

73. The system according to claim 71 wherein the equations comprise a first block length encoding equation representing the first data format, a second block length encoding equation representing the second data format, a third block length encoding equation representing the third data format, and a fourth block length encoding equation representing the fourth data format, and wherein each of the resultant encoded block lengths are quantized to equal to an integer multiple of an encoding constant.

74. A method of operating a computer for the storage of files on a magnetic storage medium, the method comprising the steps of:

a) inputting files into the computer, each of said files having file data;

b) organizing each file of said files into at least one logical data block having a block size, the file data for each file being stored in a spatially continuous manner;

c) encoding the block size of one data block or block sizes of multiple data blocks for each file to indicate file boundaries; and d) providing said files to a magnetic storage device for recording on the magnetic storage medium by adjacently arranging said files in logical data blocks for recording on the magnetic storage medium without placing a filemark between the adjacently arranged logical data blocks of different files.

75. A method of operating a computer to store a first file and a second file, the method comprising the steps of:

a) inputting a first file into a computer, the first file having file data;

b) organizing the first file into a first group of logical data blocks with the file data of the first file stored continuously and uninterrupted by referencing information; the first file having first file boundaries indicated by block sizes of multiple data blocks that contain the first file, the first file boundaries defined by two logical data blocks of said first group;

c) providing said first file to a magnetic storage device for recording said first file on the magnetic storage medium by preparing and storing said file data for the first file in a spatially continuous manner, said file data contiguously spanning adjacent logical data blocks within the first group without any intervening referencing information;

d) inputting a second file into the computer, the second file having file data;

e) organizing the second file into at least one data logical block with the file data of the second file being logically stored continuously and uninterrupted by referencing information, the second file having second file boundaries indicated by a block size of one data block or block sizes of multiple data blocks that contain the second file;

f) providing said second file to the magnetic storage device for recording said second file on the magnetic storage medium such that the second file is stored adjacently to said first file without any intervening filemark.

76. A method of operating a computer for file storage on a magnetic storage medium, the method comprising the steps of:

a) defining a maximum allowable data block size of a data block to be stored on the magnetic storage medium;

b) inputting a file into a memory of the computer, said file comprising file data having file characteristics;

c) assigning one data format of a plurality of data formats to the data block depending upon said file characteristics, said data formats establishing intrablock data organization; and d) encoding information as a block size of the data block, said block size representing one of said data formats assigned, the block size being indicative of the intrablock data organization, the block size being indicative of a file boundary of the file to be stored on the magnetic storage medium such that the file boundary is determinable for subsequent file retrieval from the magnetic storage medium.

77. A method of operating a computer for file storage on a magnetic storage medium, the method comprising the steps of:

a) defining a maximum allowable data block size of each data block to be recorded on the magnetic storage medium;

b) inputting a file into a memory of the computer, said file having a file size;

c) comparing the file size to the maximum allowable data block size and placing the file into a group of data blocks for file storage on the magnetic storage medium if a file size exceeds the maximum allowable data block size, dividing any file exceeding the maximum allowable data block size into file portions for placement into the group of data blocks, the file portions including a beginning portion and an end portion;

d) encoding information into the block sizes of the group, each block size representing the relative location of one corresponding data block within the group, relative locations including a first data block and a last data block within the group;

e) decoding information from the block size of any data block selected from the group of data blocks to determine whether or not the data block contains the beginning portion of the file.

78. A method of operating a computer for file storage on a magnetic storage medium, the method comprising the steps of:

a) defining a maximum allowable data block size of each data block to be recorded on the magnetic storage medium;

b) inputting a file into a memory of the computer, said file having a file size;

c) comparing the file size to the maximum allowable data block size and placing the file into a group of data blocks for file storage on the magnetic storage medium if a file size exceeds the maximum allowable data block size, dividing any file exceeding the maximum allowable data block size into file portions for placement into the group of data blocks, the file portions including a beginning portion and an end portion;

d) encoding information into the block sizes of the group, each block size representing the relative location of one corresponding data block within the group, relative locations including a first data block and a last data block within the group; and e) decoding information from the block size of any data block selected from the group of data blocks to determine whether or not the data block contains the end portion of the file.

79. A method of operating a computer for file storage, the method comprising the steps of:

a) defining a maximum allowable data block size of each data block for file storage;

b) inputting a file comprising file data into the computer, the file having a file size;

c) comparing the file size to the maximum allowable data block size;

d) placing the file into a minimum of one data block;

e) assigning a particular data format to any data block in which the file is placed depending upon the comparison so that the file data of the file is continuously positioned within any data block, said file data being uninterrupted by referencing information, the particular data format comprising a first data format if the file size is less than or equal to the maximum allowable block size, the first data format having the entire file being located in a single data block, the data block beginning in a head, the file data following the head, and a tail following the file data, the head and the tail containing descriptive data describing file properties of the file data; and f) encoding information as a distinct block size for each data block, the distinct block size representing the particular data format assigned.

80. A method of operating a computer for file storage, the method comprising the steps of:

a) defining a maximum allowable data block size of each data block for file storage;

b) inputting a file comprising file data into the computer, the file having a file size;

c) comparing the file size to the maximum allowable data block size;

d) placing the file into a minimum of one data block;

e) assigning a particular data format to any data block in which the file is placed depending upon the comparison so that the file data of the file is continuously positioned within any data block, the file data being uninterrupted by referencing information, the particular data format comprising a second data format if the file size is greater than the maximum allowable block size, the second data format having a first portion of the file being located in a beginning data block, the second data format beginning in a head followed by file data, the head containing descriptive data describing the file properties of the file data; and f) encoding information as a distinct block size for each data block, the distinct block size representing the particular data format assigned.

81. The method according to claim 80 further comprising the step of:

g) determining a remaining file size of said file by subtracting the block size of the beginning data block and by subtracting an allowance for any padding or filler units added during encoding information in step e;

h) comparing the remaining file size to the maximum allowable block size;

i) assigning a third data format to an end data block if according to the comparison, the remaining file size is less than the maximum allowable block size, the third data format having an end portion of the file in a last data block, the third data format comprising file data and a tail, the tail containing descriptive data describing file properties of the file.

82. The method according to claim 80 further comprising the step of:

g) determining a remaining file size of said file by subtracting the block size of the beginning data block and by subtracting an allowance for any padding units or filler units added during encoding information into the beginning data block in step e;

h) comparing the remaining file size to the maximum allowable block size;

i) assigning a fourth data format to an intermediate portion of the file in an intermediate block if according to the comparison, the remaining file size is greater than the maximum allowable block size, the fourth data format comprising file data; and j) encoding information into the block size of the intermediate data block to represent the fourth data format.

83. A method of operating a computer for file storage, the method comprising the steps of:

a) defining a maximum allowable data block size of each data block for file storage;

b) inputting a file comprising file data into the computer, the file having a file size;

c) comparing the file size to the maximum allowable data block size;

d) placing the file into a minimum of one data block;

e) assigning a particular data format to any data block in which the file is placed depending upon the comparison so that the file data of the file is continuously positioned within any data block, the file data uninterrupted by referencing information; and f) encoding information as a distinct block size for each data block in accordance with the block length encoding equation of $Q_j=mP+jC$, where j is any integer which is between 0 and (V−1), wherein V is the number of format variations with V=P/C, P is a pitch interval of file data, and C is a format encoding constant; the distinct block size representing the particular data format assigned.

84. A method of operating a computer for file storage, the method comprising the steps of:

a) defining a maximum allowable data block size of each data block for file storage;

b) inputting a file comprising file data into the computer, the file having a file size;

c) comparing the file size to the maximum allowable data block size;

d) placing the file into a minimum of one data block;

e) assigning a particular data format to any data block in which the file is placed depending upon the comparison so that the file data of the file is continuously positioned within any data block and uninterrupted by referencing information;

f) encoding information as a distinct block size for each data block, the distinct block size representing the particular data format assigned;

g) recording any data blocks associated with a particular file on the magnetic recording medium;

h) reading any data block recorded on the magnetic storage medium to determine its block size;

i) calculating the remainder resulting from dividing the block size by an integer multiple of the format encoding constant (C), such as the pitch interval (P); and j) identifying one of the plurality of data formats assigned to the data block by determining the respective block size associated with the corresponding remainder calculated in step i.

85. The method of operating a computer according to claim 84 wherein step i of calculating the remainder resulting from dividing the block size is accomplished by the computer executing the formula Q % P=R, wherein Q is any quantized block size representing a particular data format, % is the modulo function, R is the remainder, and P is the data pitch interval which is an integer multiple of the format encoding constant (C).

86. The method of operating a computer according to claim 84 wherein step j of identifying one of the plurality of the formats assigned is accomplished by analyzing the remainder being equal to 3C, 2C, C or 0; and wherein the remainder of 3C is associated with a first data format, the remainder of 2C is associated with a second data format, the remainder of C is associated with a third data format, and the remainder of 0 is associated with a fourth data format.

\* \* \* \* \*